US005774279A

United States Patent [19]
Kiriki et al.

[11] Patent Number: 5,774,279
[45] Date of Patent: Jun. 30, 1998

[54] RETROFOUCUS PHOTOGRAPHIC LENS

[75] Inventors: Toshihiko Kiriki; Tsutomu Kawano, both of Tokyo, Japan

[73] Assignee: Konica Corporation, Tokyo, Japan

[21] Appl. No.: 730,062

[22] Filed: Oct. 15, 1996

[30]      Foreign Application Priority Data

| Oct. 19, 1995 | [JP] | Japan | 7-271243 |
| Dec. 11, 1995 | [JP] | Japan | 7-321692 |
| Feb. 19, 1996 | [JP] | Japan | 8-030668 |
| Apr. 11, 1996 | [JP] | Japan | 8-089387 |

[51] Int. Cl.⁶ ............................. G02B 13/04; G02B 3/02
[52] U.S. Cl. ...................... 359/753; 359/752; 359/714; 359/713; 359/708
[58] Field of Search ................... 359/749–753, 359/793, 715, 714, 713, 708

[56]              References Cited

U.S. PATENT DOCUMENTS

| 5,218,480 | 6/1993 | Moskovich | 359/714 |
| 5,321,551 | 6/1994 | Choi | 359/714 |

FOREIGN PATENT DOCUMENTS

| 2-208617 | 8/1990 | Japan . |
| 2-284108 | 11/1990 | Japan . |
| 4-238312 | 8/1992 | Japan . |
| 5-264895 | 10/1993 | Japan . |
| 6-82690 | 3/1994 | Japan . |
| 6-148518 | 5/1994 | Japan . |
| 8-5908 | 1/1996 | Japan . |

Primary Examiner—Georgia Y. Epps
Assistant Examiner—Jordan M. Schwartz
Attorney, Agent, or Firm—Finnegan, Henderson, Farabow, Garrett & Dunner, L.L.P.

[57]              ABSTRACT

A retrofocus type lens includes a front lens group including at least one negative lens and a rear lens group provided nearer than the front lens group to an image side, including at least two positive lenses and a negative lens. A positive lens of the rear lens group which is closest to an object side, is made of glass. Lenses of more than half of lens elements are made of plastic, and satisfy the following conditional expression, $$0.7 < f_G/f < 4.0$$

where $f_G$ represents a focal length of the positive lens of the rear lens closest to an object side, and f represents a focal length of an entire optical system.

25 Claims, 23 Drawing Sheets

SPHERICAL ABERRATION

ASTIGMATISM

DISTORTION

FIG. 7
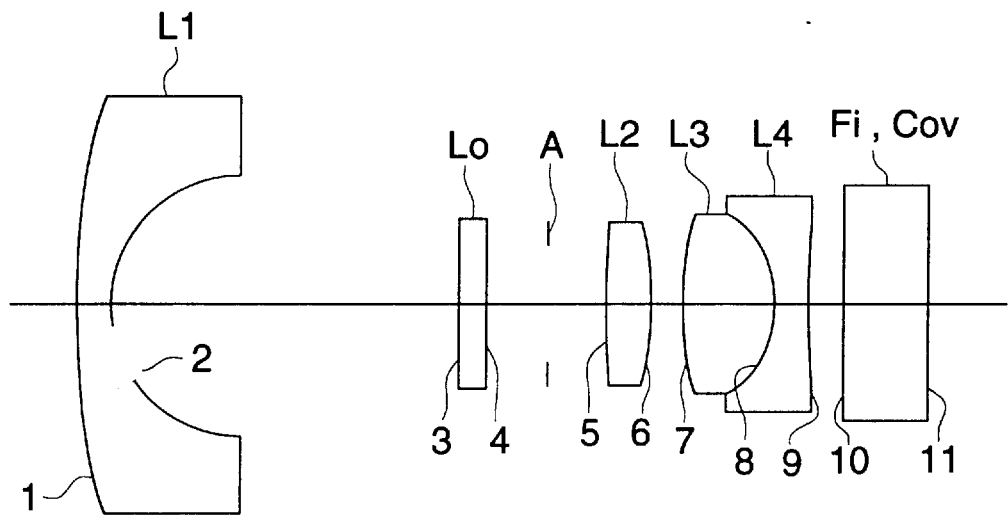
FIG. 8(a)  FIG. 8(b)  FIG. 8(c)
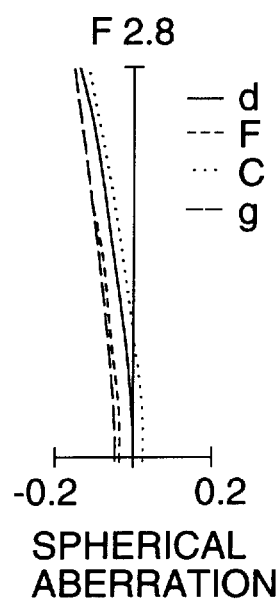
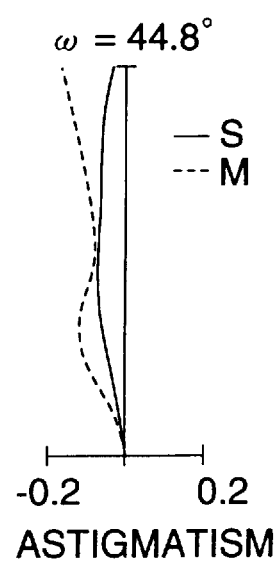
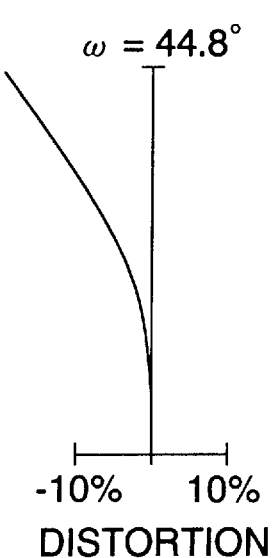

SPHERICAL ABERRATION

ASTIGMATISM

DISTORTION

FIG. 19
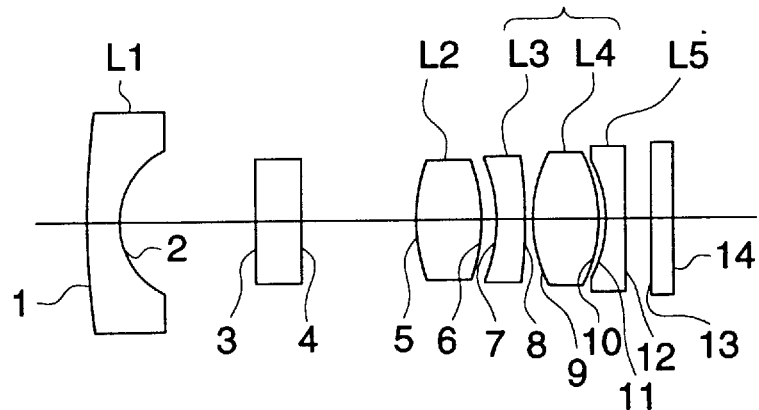
FIG. 20 (a)    FIG. 20 (b)    FIG. 20 (c)
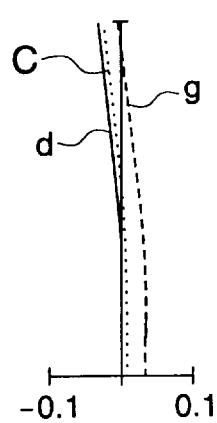
SPHERICAL
ABERRATION
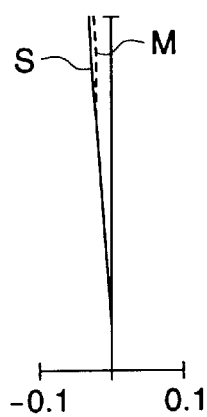
ASTIGMATISM
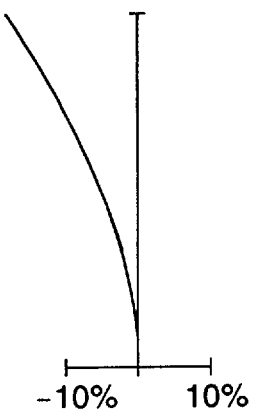
DISTORTION

FIG. 21
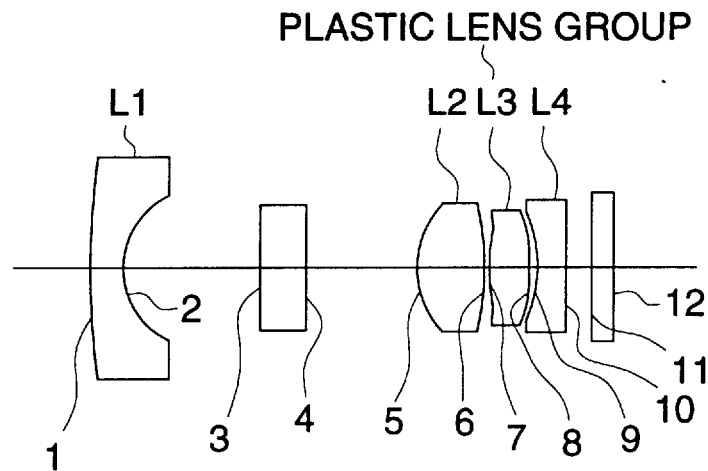
FIG. 22(a)   FIG. 22(b)   FIG. 22(c)
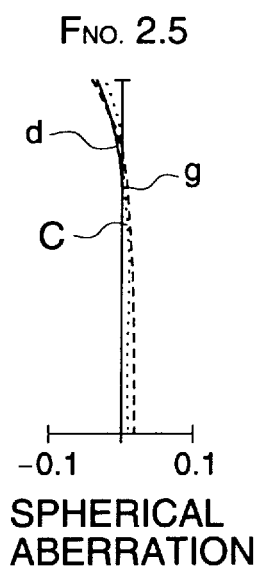
SPHERICAL
ABERRATION
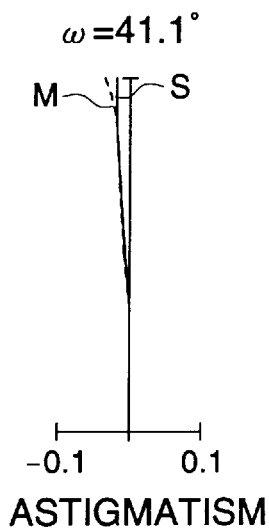
ASTIGMATISM
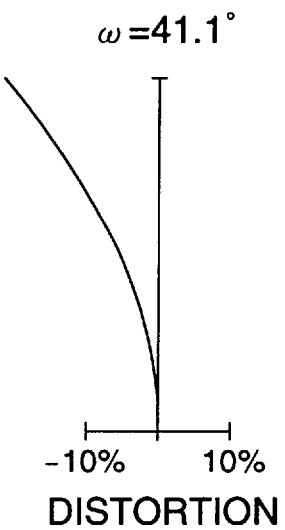
DISTORTION FIG. 24 (a)    FIG. 24 (b)    FIG. 24 (c)
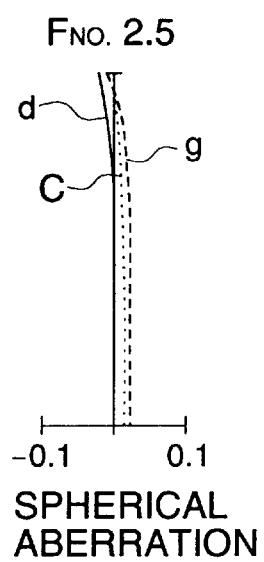
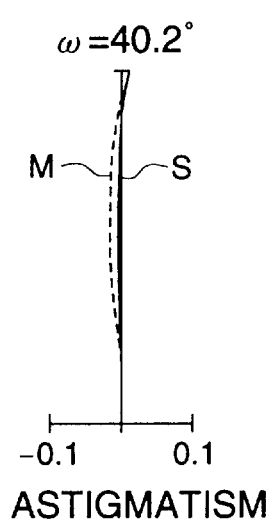
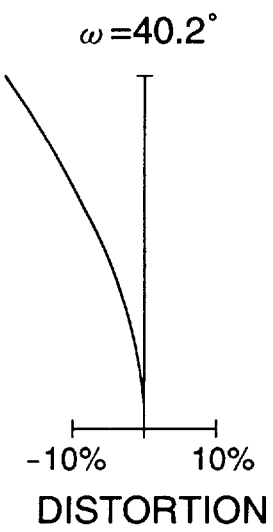
SPHERICAL ABERRATION    ASTIGMATISM    DISTORTION

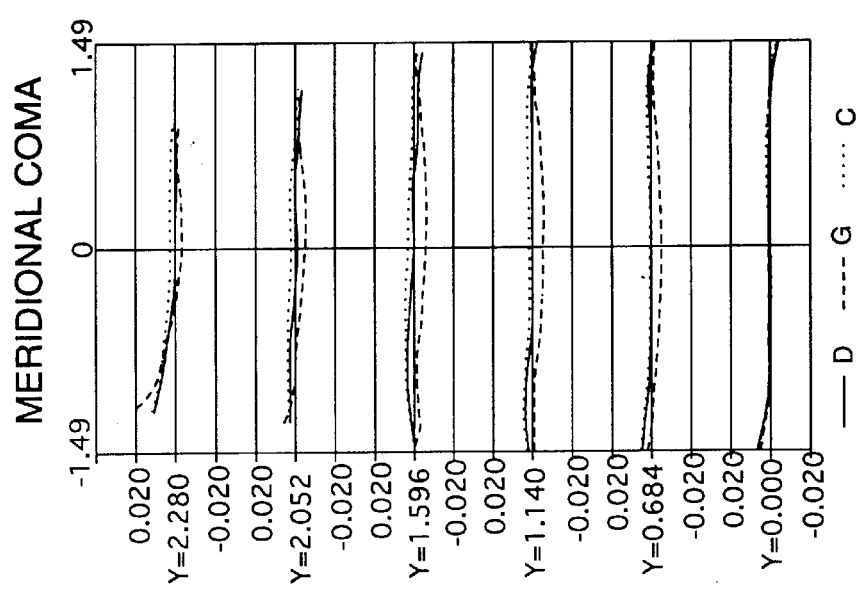
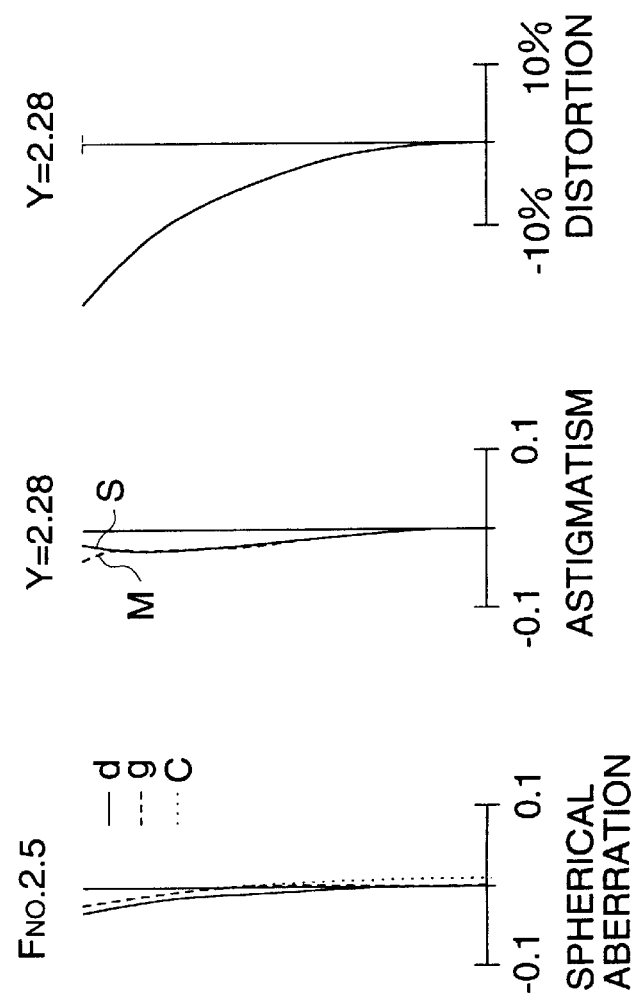

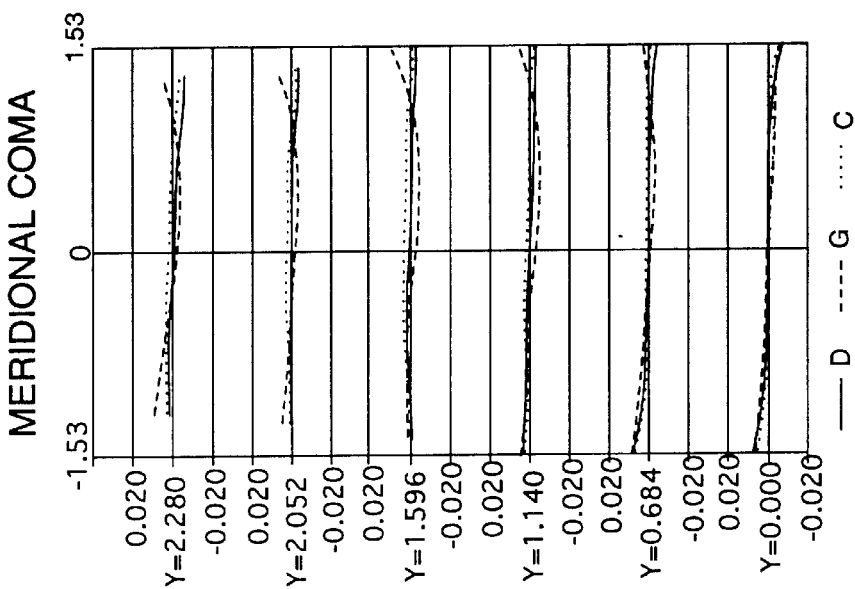
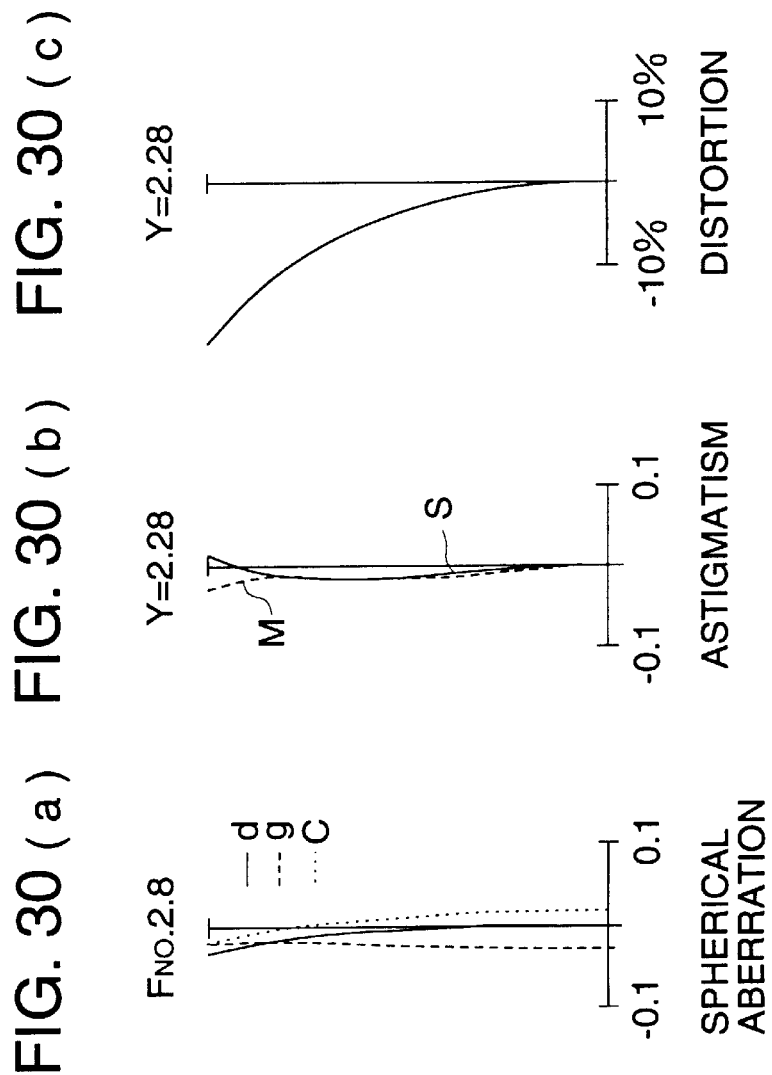

RETROFOUCUS PHOTOGRAPHIC LENS

BACKGROUND OF THE INVENTION

The present invention relates to a retrofocus type lens, and specifically to a lens which is appropriate for a video camera, a monitoring camera, and further for an image input device of a personal computer, a visual telephone, and a camera.

Conventionally, the following example is widely known as a retrofocus type lens in which the number of lens elements is about 3–4; a negative lens is arranged on an object-side; and a totally positive lens group are arranged on the image-side, with a comparatively long space between it and the negative lens. For example, as an example of a 3-element lens, Japanese Patent Publication Open to Public Inspection Nos. 82690/1994, and 148518/1994 have been disclosed. In these publications, a positive lens group on the image-side is composed of lenses in which a positive lens and a negative lens are cemented.

Further, as examples of a 4-element lens, Japanese Patent Publication Open to Public Inspection Nos. 264895/1993, 208617/1990, and 284108/1990 have been disclosed.

However, in lenses, disclosed in Japanese Patent Publication Open to Public Inspection Nos. 82690/1994, and 148518/1994, which are examples of the 3-element lens, materials of high refractive index are used for the cemented lens, and further, an aspherical lens is formed of high-refractive index materials. Normally, glass is required as a material for refractive index of n=about 1.8, resulting in very high production cost.

Further, in a lens disclosed in Japanese Patent Publication Open to Public Inspection No. 264895/1993, which is an example of a 4-element lens, the third positive lens is separated from the fourth negative lens, and thereby, the performance degradation due to eccentricity in the assembling process is easily caused. Further, the first lens is made of a high refractive index material having the refractive index of more than 1.65, resulting in high production cost. Further, no practical plastic material exists in the area of a refractive index of more than 1.65, and therefore, when an aspherical surface is required, a molded glass lens is required, resulting in a further increase of cost.

Still further, regarding a lens, disclosed in Japanese Patent Publication Open to Public Inspection No. 208617/1990, it is proposed to use a large number of plastic lenses. However, position of focal plane is not compensated for change of temperature.

Further, the third element concave lens is separately arranged from the fourth convex lens, and therefore, there are problems of a coma-flare or of eccentric sensitivity.

Furthermore, in a lens disclosed in Japanese Patent Publication Open to Public Inspection No. 284108/1990, in the same manner as in the above example, the lens is composed of only spherical glass, and therefore, the lens can not be used for a wide angle of view.

Yet further, an optical system used for a visual telephone or an image input device of a personal computer, is required to be small, and yet to have a large angle of view. Further, normally, a CCD is used as an image taking device, thereby, it is required that the telecentricity is excellent in order to prevent a decrease in the amount of light at the peripheral portion. Still further, it is required that the resolution of the optical system is very high in order to attain the desired image quality, when the inputted image is displayed on the full screen of the personal computer.

However, an optical system, disclosed in Japanese Patent Publication Open to Public Inspection No. 82690/1994, has a large curvature of field, and the optical systems, respectively disclosed in Japanese Patent Publication Open to Public Inspection No. 148518/1994, and Japanese Patent Publication Open to Public Inspection No. 238312/1992, have insufficient correction of lateral chromatic aberration, and thereby, the resolution of off-axis image is insufficient in the respective optical systems.

Further, in the optical system disclosed in Japanese Patent Publication Open to Public Inspection No. 284108/1990, the interval between the front group and the rear group is large, and thereby, when a wide angle lens is required, the clear aperture of the front group lens becomes large, resulting in a large overall optical system.

Furthermore, conventionally, many retrofocus type lenses having good telecenricity are disclosed, and which are composed of 4 or 5 lens elements. Specifically, in Japanese Patent Publication Open to Public Inspection Nos. 208617/1990, and 5908/1996, an optical system is disclosed, which includes 2 plastic lenses, widely recognized as a light and inexpensive material of overall 4 lens elements, so that of the weight and cost of the overall lens unit are further decreased.

However, plastic which can be selected in a refractive index and chromatic dispersion is limited as compared to glass. Accordingly, in the said optical system, it is not common that almost all or all lenses are made of plastic. In the lens system, composed of lower than 3 lens elements, specifically, the correction of chromatic aberration is insufficient.

SUMMARY OF THE INVENTION

To above-mentioned problems, the object of the present invention is to attain an inexpensive lens in which: the basic composition of the lens system is formed of approximately 4 lens elements; the lens unit is formed of not more than 6 lens elements at the maximum; the angle of view is wide from 50° to 100°; the F-number is about 2 to 3, thereby, the lens is low in weight; and even when many plastic lenses are used, well correction of aberrations is carried out, and which is used for a video camera, a monitor camera, an image input device of the personal computer , and a visual telephone.

Lenses embodying the present invention have any one of the following structures.

A retrofocus type lens comprising:
(1) From the object side, a front group having at least one negative lens; and (2) a rear group having at least 2 positive lenses and one negative lens, in which the positive glass lens closest to the object-side is positioned, wherein more than half of the lens elements are made of plastic, and satisfy the following conditional relationship;

$$0.7 < f_G/f < 4.0 \qquad (1)$$

where $f_G$: a focal length of the positive glass lens closest to the object-side in the rear lens group f: a focal length of the overall system.

The above conditional relationship is the conditions necessary for the temperature compensation of the overall system.

In both the cases where the upper limit is exceeded, and where the lower limit is not reached, the position of focal plane is changed by unallowable amount when the temperature changes. Specifically, the lower limit is not reached, an amount of aberration generated in the said glass lens becomes very large, and the number of lenses necessary for well correction of aberration is increased, which is undesirable.

Further, a retrofocus type lens having two groups of lens components including, from the objective side, a front negative group and a rear positive group. The front negative group includes at least one negative lens, and the rear positive group includes at least two positive lenses and one negative lens, wherein, when the equivalent air distance of an interval between a lens surface closest to the image-side of the front lens group and a lens surface closest to the object-side of the rear group, is D, and the focal length of the overall system is f, the retrofocus type lens satisfies the following conditional relationship, $$0.8 < D/f < 7.0; \quad (2)$$

and includes at least one aspherical surface, and wherein the negative lens in the rear lens group is a plastic lens, satisfying the following conditional relationship, when the Abbe's number of d line is $v_N$ $$25 < v_N < 37 \quad (3)$$

Alternatively, a retrofocus type lens comprising a front lens group composed of one negative lens; and a rear lens group composed of a positive lens and a lens in which a positive lens and a negative lens are cemented to each other, wherein the retrofocus type lens has at least one aspherical surface and at least one plastic lens, and satisfies the following conditional relationship, $$25 < v_N < 37$$

and $$0.8 < D/f < 7.0;$$

where $v_N$: the Abbe's number of d-line of the negative lens of the rear lens group D: the equivalent air distance of the interval between the front lens group and the rear lens group f: the focal length of the overall system.

In these retrofocus type lens is desirable, the front lens group has at least one negative lens which has a large curvature of image-side surface more than that of the object-side surface. This shape of the lens is a condition necessary to correct the negative distortion. Further, a negative lens in the front lens group may be separated into 2 lenses for the better processability.

In the conditional relationship (2), when the lower limit is not reached, adequate correction of the negative distortion becomes difficult, and thereby, the back-focus becomes too short. Further, when the upper limit is exceeded, the overall size of the lens system becomes very large.

Furthermore, it is more preferable that the lens satisfies the following conditional relationship (4), instead of the conditional relationship (2).

$$1.0 < D/f < 5.0 \quad (4)$$

Further, in the front lens group, it is specifically preferable to correct the negative distortion that the negative lens closest to the object side has the aspherical surface for the image-side surface. Furthermore, it is preferable to use a material having a large Abbe's number $v_d$ with respect to d-line, for the correction of the lateral chromatic aberration. In cases where a plastic lens is used for reduction of cost, it is preferable to correct the distortion that an aspherical surface is used, and a material of n<1.6, $v_d$>45, or preferably n<1.55, $v_d$>45 is used, when a refractive index is n.

Next, the lens closest to the object of the rear lens group is a positive single lens. In temperature correction of the focus position of the overall system, it is most preferable that this positive lens is made of glass, and other lenses are made of plastic.

Further, the positive single lens is preferably followed by a cemented lens constructed by a positive and a negative lens. An assembly error can be more improved in the cemented lens than in a lens in which a positive lens and a negative lens are separated from each other. Further, this composition is important for the correction of the chromatic aberration, and when the Abbe's number of the positive lens is $v_P$, and that of negative lens is $v_N$, the following relationship is preferably satisfied.

$$50 < v_P < 70 \quad (5)$$

$$25 < v_N < 37 \quad (6)$$

Furthermore, it is preferable to satisfy the following conditional relationships, instead of the conditional relationships (5) and (6).

$$55 < v_P < 65 \quad (7)$$

$$27 < v_N < 33 \quad (8)$$

In the conditional relationships (5) and (7), when the lower limit is reached, correction of the longitudinal chromatic aberration and the lateral chromatic aberration is easily achieved. When the upper limit is not exceeded, although the selectable range of, specifically, plastic material is limited, relatively inexpensive material can be used, resulting in a reduction in cost.

Further, in the conditional relationships (6) and (8), the upper limit is exceeded, the correction of the chromatic aberration, specifically, correction of the lateral chromatic aberration becomes more difficult. When the lower limit is not reached, the material is expensive, and specifically, in plastic material, the selectable range is greatly reduced, except for special expensive materials.

Further, in the present invention, a negative lens arranged at the image-side of the rear lens group, may be composed of one lens in which a negative lens and a positive lens are cemented each other as shown in Examples 1 through 4, and Example 7, which will be described later. Alternatively, as shown in Examples 5 and 6, this negative lens may be composed of a combination of one negative lens used for cementing with a positive lens, and another separate negative lens. In any case, when the negative lens is arranged closer to the image-side than a positive lens, correction of the lateral chromatic aberration is well corrected. Furthermore, it is preferable to reduce the cost of the negative lens by using plastic lenses. Reversely, when this negative lens is composed of a glass lens, compensation for temperature becomes more difficult. Accordingly, when the conditional relationships (6) and (8) are more commonly expressed by the same above reason, and when the Abbe's number of the negative lens is $v_N$ the negative lens more preferably satisfies the following relationship, $$25 < v_N < 37 \quad (9)$$

Further, it is more preferable to satisfy the following relationship.

$$27 < v_N < 33 \tag{10}$$

Still further, it is preferable in cost that the cemented-lens is a plastic-cemented lens.

A primary object in the present invention, is a lens in which a CCD, specifically, a CCD for color is used on the image surface. It is preferable that an aperture-stop is arranged in front of the first positive lens, from the object-side; and after the principal ray, passing through the center of the aperture-stop relating the maximum image height, has passed the last lens, when an angle formed between the optical axis and the principal ray is θ, θ is preferably about θ<20°.

Further, the present invention is a small-sized lens for a CCD, and it is preferable that a diffraction type low-pass filter is used specifically for the reduction of cost. Specifically in the composition of the present invention, it is preferable that the low-pass filter is arranged in front of the aperture-stop. When a fixed diaphragm to cut a port-on of off-axis light is provided near the object-side surface, or the image side surface, of the diffraction type low-pass filter, using a stopper surface to set this filter to a lens frame, then, the coma flare of the off-axial light can be cut, and the telecentricity can be excellent, while still maintaining an appropriate ratio of the amount of peripheral light.

Further, in the present invention, when the radius of curvature of the surface of the image-side closest to the image-side is $R_f$, it is preferable for the lens system to satisfy the following conditional relationship, $$-0.3 < f_B/R_f < 0.3 \tag{11},$$

where, $f_B$: the back-focus.

When the lower limit of the conditional relationship (11) is not reached, correction of the lateral chromatic aberration is difficult. Further, when the upper limit of the conditional relationship (11) is exceeded, a ghost caused by reflection from the lens surface of the closest image-side and the CCD surface, becomes strong.

In this connection, it is preferable that the following conditional relationship is satisfied instead of the conditional relationship (11), $$-0.17 < f_B/R_f < 0.2 \tag{12}.$$

Further, in the present invention, in the case of the said rear group including cemented lens, when the radius of curvature of the cemented surface of the cemented lens is $R_C$, it is preferable that the lens system satisfies the following conditional relationship, $$-1.3 < R_C/f < -0.3 \tag{13}$$

When the lower limit of the conditional relationship is not reached, the achromatic effect is decreased.

Further, when the upper limit is exceeded, the radius of curvature of the cemented surface becomes too small, resulting in difficult processing. Further, it is more preferable that the following conditional relationship is satisfied, $$-1.1 < R_C/f < -0.5 \tag{14}.$$

In order to attain the above-mentioned object, an optical system of still another retrofocus type lens, has the following structure.

An optical system of the retrofocus type lens comprises, from the object-side: a front lens group composed of a plastic lens having a negative power; a rear lens group composed of, separated from the front lens group with the largest air-interval, a double-convex surface glass lens; a plastic lens group composed of one or more plastic lenses, in which the plastic lens group has a positive power; and a negative lens, which satisfies the following conditional relationship, $$0.3 \leq (1-m_3)^2/(m_2^2 \cdot m_3^2) \leq 3.5 \tag{15},$$

$$v_g \geq 48 \tag{16},$$

where, $m_2$: the paraxial lateral magnification by the double-convex lens, closest to the object-side in the rear lens group $m_3$: the paraxial lateral magnification by the said plastic lens group, in the rear lens group $v_g$: Abbe's number of d-line of the double-convex closest to the object-side in the rear lens group.

Further, the lens system preferably satisfies the following conditional relationship, $$1.5 < D/f < 5 \tag{17},$$

where, D: the equivalent air distance of the front and rear lens groups f: the focal length of the overall lens system.

Further, it is preferable that the lens system satisfies the following conditional relationships instead of the conditional relationships (16) and (17), $$v_g \geq 60 \tag{18}$$

$$2.0 < D/f < 3.5 \tag{19}.$$

In the present invention, the optical system is retrofocus type, which is composed of a front lens group having a negative power and a rear lens group having a positive power, and a comparatively large air-space is arranged between the front lens group and the rear lens group, so that the optical system has excellent telecentricity. However, respective lens groups do not include a non-power optical element like a low-pass filter or cover glass arranged in the optical system.

Further, in order to realize reduction of the overall size and cost of the lens system, the number of lens composition elements is 4–5 or less, the front lens group and a portion of the rear lens group is composed of plastic lenses.

However, in the plastic lens, the change of refractive index and the shape due to temperature, is large, and thereby, the position of the focal plane is changed due to a change of temperature, which is a major disadvantage.

The symbol Δ is the amount of changing the focus position, due to a change of temperature, of the plastic lens in the optical system of the present invention, can be approximately expressed by the following relationship, $$\Delta = \Delta f_1 \cdot m_2^2 \cdot m_3^2 \cdot m_4^2 + \Delta f_3 (1-m_3)^2 m_4^2. \tag{20}$$

Where, $\Delta f_1$: amount of change of the focal length of the front lens group $\Delta f_3$: amount of change of the focal length of the plastic lens group in the rear lens group $m_2$: axial lateral magnification by the double-convex lens, closest to the object-side, in the rear lens group $m_3$: axial lateral magnification by the plastic lens group, in the rear lens group $m_4$: an axial lateral magnification by the negative lens, in the rear lens group As can clearly be seen from the conditional relationship (20), because of the front lens group having a negative power, and plastic lens group having a positive power, changes of these lens group can be eliminated with each other.

Further, when the lens system satisfies the conditional relationship (15), the amount of change by $\Delta f_1$ is almost equal to that by $\Delta f_3$, and thereby, the change of the focal position due to temperature changes can be satisfactorily compensated for.

When $m_2$ and $m_3$ exceed the upper limit of the conditional relationship (15), the amount of change of the focal point due to $\Delta f_3$ remains large. Conversely, when the lower limit of the conditional relationship (15) is not reached, the amount of change of the focal point due to $\Delta f_1$ also remains large, and thereby, it is difficult to satisfactorily correct a change of the focal point.

In this connection, when each lens is held by the plastic lens frame, intervals between each lens groups are minutely changed by temperature changes, and the focal position changes. In such cases, it is preferable that the lens system satisfies the following conditional relationship, $$1.0 \leq (1-m_3)^2/(m_2^2 \cdot m_3^2) \leq 3.5$$

Further, when the power of the double-convex lens, closest to the object-side, in the rear lens group is determined so as to satisfy the conditional relationship (15), this lens has the strong power, resulting in generation of large lateral chromatic aberration. Accordingly, $v_g$ is required to satisfy the conditional relationship (16). When $v_g$ does not reach the lower limit of the conditional relationship (16), it is difficult to correct the lateral chromatic aberration. In order to satisfactorily correct the lateral chromatic aberration, it is further required for the lens system to satisfy the conditional relationship (18).

Further, when a lens, closest to the object-side, in the rear lens group is formed into the meniscus-shape, the power is strong, and the curvature of the convex surface is very large, resulting in difficult processing. Accordingly, it is desirable that the lens is formed of a double-convex surface.

The conditional relationship (17) is related to the monochromatic aberration and the size of the lens system, and when D/f becomes large, exceeding the upper limit of the conditional relationship, the overall length of the optical system becomes large, and the clear aperture of the front lens group becomes large, which is undesirable. Further, when D/f does not reach the lower limit, the negative distortion becomes excessive, and outer-coma becomes large, which is also not preferable.

When the conditional relationship (19) is satisfied, the balance of these factors can be further improved.

In order to reduce the overall size and cost of the optical system, it is preferable that the plastic lens group in the rear lens group is composed of 1 or 2 lens elements.

In this case, as can clearly be seen from the conditional relationship (20), when the plastic lens group in the rear group is composed of only a negative lens, temperature changes of the plastic lens can not be compensated for. In cases where the plastic lens group is composed of 2 lens elements, when one of the 2 lens elements is a negative lens, and the other lens is a positive lens, it is advantageous for correction of the lateral chromatic aberration. Further, when 2 lens elements of the plastic lens group are arranged in the order of a positive lens and a negative lens from the object-side, 2 negative lenses are arranged closest to the image-side in the optical system, so that the telecentricity does not become well. Accordingly, it is preferable that the plastic lens group is composed of a positive lens, or of a negative lens and a positive lens:.

In order to correct the distortion, it is preferable that at least one aspherical surface is used in the front lens group. In this case, when the lens surface at the object-side is an aspherical surface, the aspherical surface is formed such that it is more displaced to the image-side as it goes away from the optical axis, as compared to the case of a spherical surface. In contrast to this, when the lens on the image-side is an aspherical surface, it is formed such that it is displaced to the object-side, as it goes away from the optical axis, as compared to the case of a spherical surface.

Further, in order to correct spherical aberration, it is preferable that a lens surface on the object-side of any lens in the positive lens closest to the object-side, or plastic lens group, in the rear lens group, is aspherical. This aspherical surface is formed such that it is more displaced to the object-side as going away from the optical axis, as compared to the case of a spherical surface.

In order to attain the above-mentioned objects, another optical system in the present invention is structured as follows.

A retrofocus type lens comprising: from the object side, a front lens group and the rear lens group; the front lens group being composed of a first lens having negative power, and the second lens having positive power; an aperture-stop is positioned between the front lens group and rear lens group; the rear lens group being composed of a third lens having positive power, a fourth lens having negative power, and a fifth lens having positive power; the rear lens group having at least one aspherical surface in which the thickness of lens is larger at the peripheral portion, as compared to the case where the lens surface is structured with the curvature near the optical axis; and the lens system satisfies the following conditions, $$-5 \leq v_1 - v_2 \leq 30, \qquad (21)$$

$$-0.020 \leq \sum_{i=3}^{5} \frac{f}{f_i v_i} \leq 0 \qquad (22)$$

where, $f_i$ (i=3, 4, 5): the focal length of the i-th lens f : the focal length of the overall system $v_j$ (j=1, 2, . . . , 5) : Abbe's number of the j-th lens It is preferable that the said aspherical surface is used for the fifth lens.

Further, it is desirable that at least one of the second lens or the third lens has at least one aspherical surface in which the thickness of lens is larger at the peripheral portion, as compared to cases where the lens surface is structured with the curvature near the optical axis.

It is a desirable embodiment that the third lens is composed of a glass lens, and other lenses are structured of plastic lenses.

In the present invention, a wide angle lens is obtained by constituting the retrofocus type lens, in which a lens having a negative power is arranged at the object-side, and an image forming system is arranged at the image-side.

Further, in order to attain an excellent image forming performance, it is required to appropriately correct not only monochromatic aberration, but also for longitudinal and lateral chromatic aberration. Accordingly, the second lens having a positive power is arranged closer to the object-side with respect to the aperture-stop; a lateral chromatic aberration generated in the second lens, which is reverse to that generated in the first lens, is canceled with each other; and the lens system satisfies conditional relationships (21) and (22), so that the longitudinal and lateral chromatic aberration are satisfactorily corrected. Herein, the conditional relationship (21) provided for well-balanced correction of longitudinal and lateral chromatic aberration due to the first and the second lenses. When the lower limit is not reached, the lateral chromatic aberration generated in the first lens remains large, and it is difficult to correct the aberration by the lens group closer to the image-side with respect to the aperture-stop. In contrast to this, when the upper limit is exceeded, longitudinal chromatic aberration becomes undercorrected very much.

Further, when the conditional relationship (22) is satisfied, the chromatic aberration generated in the rear lens group, is satisfactorily corrected. When the upper limit: of the conditional relationship (22) is exceeded, it is difficult to correct the lateral chromatic aberration which is largely generated in the third lens. In contrast to this, when the lower limit is not reached, the lateral chromatic aberration remains, the direction of which is reverse to the lateral chromatic aberration generated by the third lens.

In order to satisfactorily correct the chromatic aberration, it is desirable that the conditional relationships (21) and (22) respectively satisfy the following range.

$$-5 \leq v_1 - v_2 \leq 5 \qquad (23)$$

$$-0.010 \leq \sum_{i=3}^{5} \frac{f}{f_i v_i} \leq -0.005 \qquad (24)$$

Further, in order to obtain excellent overall image, it is required to have a flat image surface. However, when the optical system of the present invention is structured by using a plastic material, having a comparatively low refractive index, specifically, a meridional field is largely curved toward the under direction and astigmatism is very large. Accordingly, at least one aspherical surface is used, and the thickness of the edge portion of the aspherical surface at the periphery is made larger than in the case where the lens surface is structured with the curvature near the optical axis. That is, when an aspherical surface is used in which the power of the peripheral portion is smaller compared to that near the optical axis when used for a positive lens, and the power of the peripheral portion is larger compared to that near the optical axis when used for the negative lens, then, the astigmatism can be excellently corrected. When such an aspherical surface is used for the fifth lens, the large barrel type distortion, generated in the first lens and the third lens, can also be corrected.

Further, for larger aperture, it is desirable to excellently correct the spherical aberration and coma. Accordingly, when an aspherical surface, in which the positive power becomes smaller as the distance from the optical axis is larger, is used for the second or third lens, the spherical aberration and coma can be excellently corrected.

Due to these structure, almost all lenses can be structured of plastic. Although plastic lenses are limited within the low refractive index range as compared to glass, and the selectable range of chromatic dispersion of the plastic lenses is also limited, its specific weight is about half of the glass lens and relatively light. Accordingly, when almost all lenses are made of plastic, a rather light optical system can be realized.

However, the change of focal length of a plastic lens due to temperature change is large. Accordingly, in lenses constituting the optical system of the present invention, when the third lens, in which a change of the focal length causes the largest influence on the change of the focal length of the overall optical system, is made of glass, and all other lenses are made of plastic, an optical system can be obtained, in which weight is rather light and the change of the focal length due to temperature is relatively small.

Further, the above-mentioned object is attained by the following structure.

A retrofocus type lens comprising a front lens group and a rear lens group in order from an object-side: the front lens group being composed of a double-concave surface lens having at least one aspherical surface; the largest air-interval in the overall system is provided between the front lens group and the rear lens group; the rear lens group being composed of a positive single lens and a cemented lens in order from the object-side, and having at least one aspherical surface; and an aperture-stop positioned closer to the object side with respect to the cemented lens, which satisfies the following conditions;

$$-1.7 \leq r_A/r_B \leq 0.2 \qquad (25)$$

$$0 \leq f_P/f_C \leq 1.1 \qquad (26)$$

$r_A$: the radius of curvature on the object-side of The positive single lens in the rear lens group $r_B$: the radius of curvature on the image-side of the positive single lens in the rear lens group $f_P$: the focal length of the positive single lens in the rear lens group $f_C$: the focal length of the cemented lens in the rear lens group.

In the present invention, the optical system is retrofocus type, which is composed of a front lens group having a negative power and a rear lens group having a positive power, and a comparatively large air-space is arranged between the front lens group and the rear lens group, so that the optical system has excellent telecentricity. Herein, in order to reduce the overall size of the optical system, it is desirable that the interval between the front lens group and the rear lens group is optimally small. However, when the interval is small, the power of each lens group is strong, and thereby, an amount of the aberration is increased. Specifically, when the optical system is composed of plastic lenses having a low refractive index, the curvature of each lens surface is increased, and thereby, any aberration becomes very large. Accordingly, the front lens group is composed of a double-concave lens, and thereby, the amount of astigmatism generated in the overall optical system is suppressed. However, when a double-concave lens is used, an amount of generation of the barrel type distortion is increased, as compared to the case of a meniscus lens, which is convex toward the objectside. Therefore, when at least one aspherical surface is used for the double-concave lens, the distortion is corrected.

The conditional relationship (25) is a condition for excellently correcting the spherical aberration. When the lens system does not satisfy the range of the conditional relationship (25), the spherical aberration is not sufficiently corrected. Further, when an aspherical surface is also used in the rear lens group, a monochromatic aberration can be excellently corrected. Specifically, when an aspherical surface, in which the lens thickness is large as the distance from the optical axis is increased, as compared to the case of the spherical surface, is used for the surface adjoining the aperture-stop, then, the spherical aberration and coma can be excellently corrected. When an aspherical surface, in which the lens thickness is large as the distance from the optical axis is increased, as compared to the case of the spherical surface, is used for the surface closest to the image-side, astigmatism is excellently corrected, and the barrel type distortion can also be corrected.

Further, when a cemented lens is used at a position closer to the image-side than an aperture-stop, the chromatic aberration can be corrected.

The conditional relationship (26) is a condition to excellently correct chromatic aberration. When the upper limit of this relationship is exceeded, the longitudinal chromatic aberration and lateral chromatic aberration can not be corrected, being well-balanced. In this case, when the longitudinal chromatic aberration is excellently corrected, the lateral chromatic aberration is increased, and when the lateral chromatic aberration is excellently corrected, the longitudinal chromatic aberration becomes over-correction very much. In contrast to this, when the lower limit of the conditional relationship (26) is not reached, the back focus becomes short and the telecentricity are deteriorated. Further, the amount of generation of coma is increased, and it is difficult to correct the coma.

BRIEF DESCRIPTION OF THE DRAWINGS

FIG. 7 is a sectional view of the lens in Example 4.

FIGS. 8(a), 8(b) and 8(c) are views of aberration in Example 4.

FIG. 19 is a sectional view of the lens of a retrofocus type lens in Example 10.

FIG. 20(a), 20(b) and 20(c) are views of aberrations of the retrofocus type lens in Example 10.

FIG. 21 is a sectional view of the lens of a retrofocus type lens in Example 11.

FIGS. 22(a), 22(b) and 22(c) are views of aberrations of the retrofocus type lens in Example 11.

FIGS. 24(a), 24(b) and 24(c) are views of aberrations of a retrofocus type lens in Example 12.

FIGS. 26(a), 26(b), 26(c) and 26(d) are views of aberrations in Example 13.

FIGS. 30(a), 30(b), 30(c) and 30(d) are views of aberrations in Example 15.

DETAILED DESCRIPTION OF THE PREFERRED EMBODIMENTS

Referring to FIGS. 1 through 18(c), examples 1 through 9 of a retrofocus type lens of the present invention will be detailed below.

Codes in each example mean the following.

f: the focal length

F: F-number $f_b$: back focus $\omega$: half angle of view r: radius of curvature of a refractive surface d: interval between lens surfaces $n_d$: refractive index of lens material with respect to d-line $v_d$: Abbe's number of lens material with respect to d-line $f_P$: focal length of a positive single lens in the rear lens group $f_C$: focal length of a cemented lens in the rear lens group $r_A$: radius of curvature, at the object-side, of a positive single lens in the rear lens group $r_B$: radius of curvature, at the image-side, of a positive single lens in the rear lens group A: aperture-stop $L_o$: diffraction type low-pass filter $F_i$: An infrared ray cut filter Cov: CCD cover glass L1: 1st lens L2: 2nd lens L3: 3rd lens L4: 4th lens L5: 5th lens L6: 6th lens An aspherical surface is expressed by the following equation 1.

$$X = \frac{h^2/r}{1 + \sqrt{1-(K+1)h^2/r^2}} + \sum_i A_{2i}h^{2i} \quad \text{[Equation 1]}$$

where, X : the length of a vertical line dropped from one point on the aspherical surface, gone away from the optical axis by a distance h, to a tangential plane of the apex of the aspherical surface.

h: distance from the optical axis.

K, $A_{2i}$: an aspherical coefficient

[EXAMPLE 1]

Lens data when f=4.4, F2.8 and 2$\omega$=81°, are shown in Table 1.

TABLE 1

| Surface No. | r | d | $n_d$ | $V_d$ | Remarks |
|---|---|---|---|---|---|
| 1 | 16.473 | 1.17 | 1.49200 | 57.0 | 1st lens $L_1$ (plastic lens) |
| 2 (aspherical) | 3.337 | 8.42 | | | |
| 3 | ∞ | 1.00 | 1.49200 | 57.0 | Diffraction type low pass filter $L_O$ |
| 4 | ∞ | 3.60 | | | |
| 5 | 14.526 | 1.50 | 1.72916 | 54.7 | 2nd lens $L_2$ (glass lens) |
| 6 | −10.930 | 1.00 | | | |
| 7 (aspherical) | 10.000 | 3.00 | 1.49200 | 57.0 | 3rd lens $L_3$ (plastic lens) |
| 8 | −3.200 | 1.20 | 1.58300 | 30.0 | 4th lens $L_4$ (plastic lens) |
| 9 (aspherical) | 200.000 | 1.00 | | | |
| 10 | ∞ | 2.80 | 1.51633 | 64.1 | Infrared ray cut filter $F_i$ + CCD cover glass Cov |
| 11 | ∞ | | | | | aspherical coefficients are shown in Table 2.

TABLE 2

| Surface No. 2 | $K = -5.37000 \times 10^{-1}$ |
| | $A4 = 3.84200 \times 10^{-4}$ |
| | $A6 = 1.98940 \times 10^{-4}$ |
| | $A8 = -3.99400 \times 10^{-6}$ |
| | $A10 = -5.53310 \times 10^{-7}$ |
| | $A12 = 8.68490 \times 10^{-8}$ |
| Surface No. 7 | $K = -2.34700$ |
| | $A4 = 4.07200 \times 10^{-4}$ |
| | $A6 = -2.03870 \times 10^{-7}$ |
| | $A8 = -6.13650 \times 10^{-6}$ |
| | $A10 = 2.49650 \times 10^{-6}$ |
| | $A12 = -1.35950 \times 10^{-7}$ |
| Surface No. 9 | $K = -8.06360$ |
| | $A4 = -2.49830 \times 10^{-4}$ |
| | $A6 = 3.18860 \times 10^{-5}$ |
| | $A8 = -1.76970 \times 10^{-5}$ |
| | $A10 = 3.26660 \times 10^{-6}$ |
| | $A12 = -1.96980 \times 10^{-7}$ |

Figure 1:
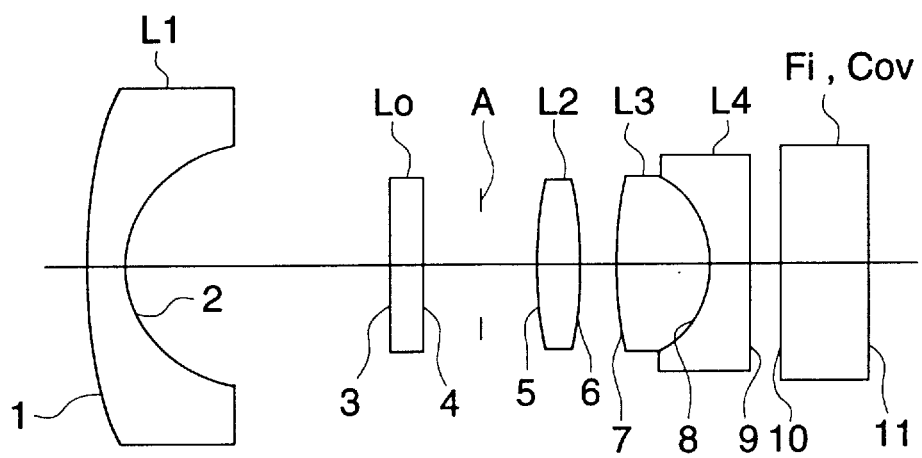
FIG. 1 is a sectional view of a lens in Example 1.
Figure 2:
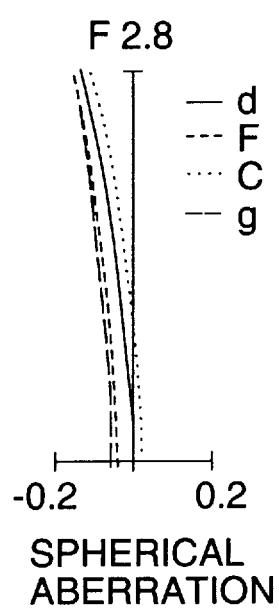
FIGS. 2(a), 2(b) and 2(c) are views of aberration in Example 1.
Figure 2:
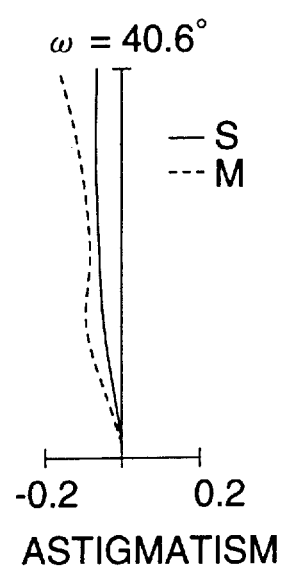
Figure 2:
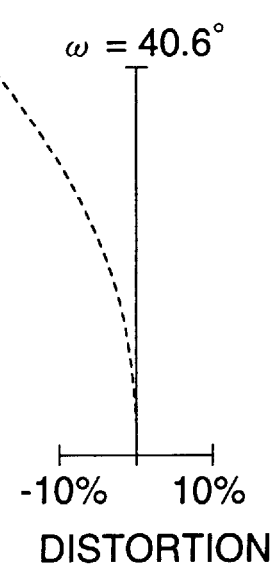

A sectional view of a lens is shown in FIG. 1, and views of aberrations are respectively shown in FIGS. 2(*a*), 2(*b*) and 2(*c*). In this connection, the object distance, in the view of aberration, is 500 mm in front of the first surface of the lens.

[EXAMPLE 2]

Lens data when f=6.0, F2.8 and 2ω=55°, are shown in Table 3.

TABLE 3

| Surface No. | r | d | $n_d$ | $V_d$ | Remarks |
|---|---|---|---|---|---|
| 1 | 9.483 | 1.17 | 1.49200 | 57.0 | 1st lens $L_1$ (plastic lens) |
| 2 (aspherical) | 3.221 | 3.50 | | | |
| 3 | ∞ | 1.00 | 1.49200 | 57.0 | Diffraction type low-pass filter $L_O$ |
| 4 | ∞ | 3.60 | | | |
| 5 | 9.595 | 1.50 | 1.72916 | 54.7 | 2nd lens $L_2$ (glass lens) |
| 6 | −14.787 | 1.00 | | | |
| 7 (aspherical) | 8.889 | 3.00 | 1.49200 | 57.0 | 3rd lens $L_3$ (plastic lens) |
| 8 | −3.478 | 1.20 | 1.58300 | 30.0 | 4th lens $L_4$ (plastic lens) |
| 9 (aspherical) | 108.530 | 1.00 | | | |
| 10 | ∞ | 2.80 | 1.51633 | 64.1 | Infrared ray cut filter $F_i$ + CCD cover glass Cov | aspherical coefficients are shown in Table 4.

TABLE 4

| Surface No. 2 | $K = -4.21070 \times 10^{-1}$ |
| | $A4 = 5.67740 \times 10^{-4}$ |
| | $A6 = 1.55180 \times 10^{-4}$ |
| | $A8 = -5.04190 \times 10^{-6}$ |
| | $A10 = -1.58420 \times 10^{-7}$ |
| | $A12 = 1.03880 \times 10^{-7}$ |
| Surface No. 7 | $K = -2.33480$ |
| | $A4 = 1.57680 \times 10^{-3}$ |
| | $A6 = 7.99470 \times 10^{-5}$ |
| | $A8 = -3.34980 \times 10^{-5}$ |
| | $A10 = 5.28560 \times 10^{-6}$ |
| | $A12 = -2.43380 \times 10^{-7}$ |
| Surface No. 9 | $K = -8.06360$ |
| | $A4 = 3.36420 \times 10^{-3}$ |
| | $A6 = 8.70600 \times 10^{-5}$ |
| | $A8 = 7.33580 \times 10^{-7}$ |
| | $A10 = -2.89620 \times 10^{-7}$ |
| | $A12 = 2.41220 \times 10^{-8}$ |

Figure 3:
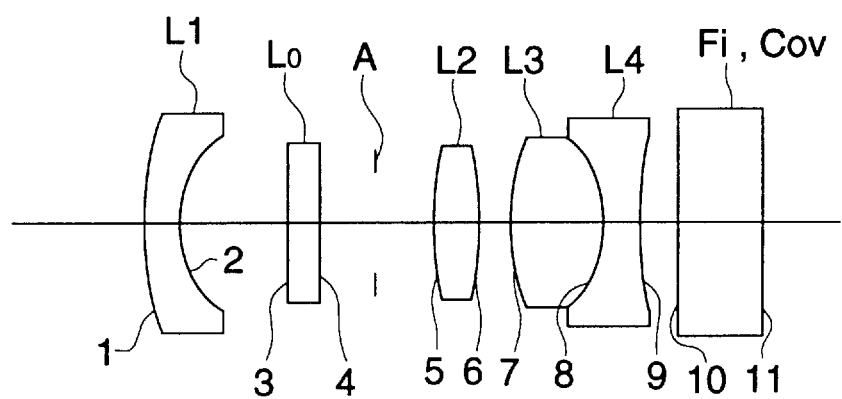
FIG. 3 is a sectional view of a lens in Example 2.
Figure 4:
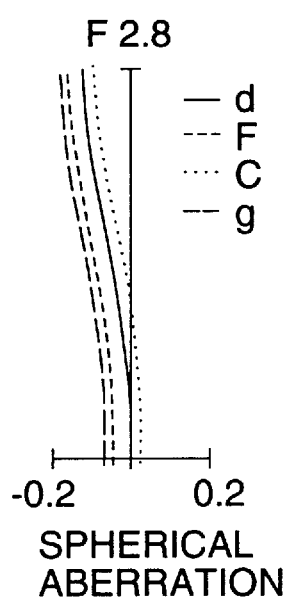
FIGS. 4(a), 4(b) and 4(c) are views of aberration in Example 2.
Figure 4:
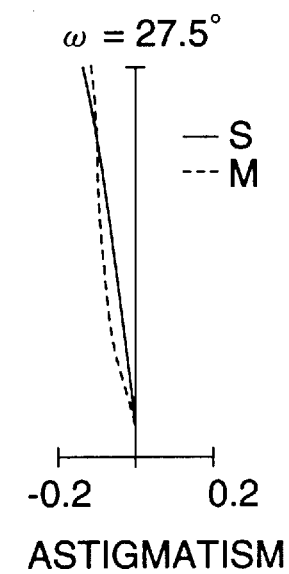
Figure 4:
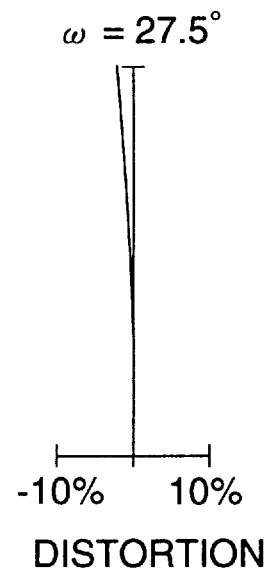

A sectional view of a lens is shown in FIG. 3, and views of aberrations are respectively shown in FIGS. 4(*a*), 4(*b*) and 4(*c*).

In this connection, the object distance, in the view of aberration, is 500 mm in front of the first surface of the lens.

[EXAMPLE 3]

Lens data when f=3.8, F2.8 and 2ω=97°, are shown in Table 5.

TABLE 5

| Surface No. | r | d | $n_d$ | $V_d$ | Remarks |
|---|---|---|---|---|---|
| 1 | 23.563 | 1.17 | 1.49200 | 57.0 | 1st lens $L_1$ (plastic lens) |
| 2 (aspherical) | 3.343 | 10.86 | | | |
| 3 | ∞ | 1.00 | 1.49200 | 57.0 | Diffraction type low-pass filter $L_O$ |
| 4 | ∞ | 3.60 | | | |
| 5 | 15.085 | 1.50 | 1.72916 | 54.7 | 2nd lens $L_2$ (glass lens) |
| 6 | −11.553 | 1.00 | | | |
| 7 (aspherical) | 9.247 | 3.00 | 1.49200 | 57.0 | 3rd lens $L_3$ (plastic lens) |
| 8 | −3.200 | 1.20 | 1.58300 | 30.0 | 4th lens $L_4$ (plastic lens) |
| 9 (aspherical) | 66.208 | 1.00 | | | |
| 10 | ∞ | 2.80 | 1.51633 | 64.1 | Infrared cut filter $F_i$ + CCD cover glass Cov |
| 11 | ∞ | | | | | aspherical coefficients are shown in Table 6.

TABLE 6

| Surface No. 2 | K = −4.93330 × 10$^{-1}$ |
| --- | --- |
| | A4 = −4.47690 × 10$^{-4}$ |
| | A6 = 2.40800 × 10$^{-4}$ |
| | A8 = −3.96950 × 10$^{-6}$ |
| | A10 = −1.02490 × 10$^{-6}$ |
| | A12 = 8.52390 × 10$^{-8}$ |
| Surface No. 7 | K = −2.34780 |
| | A4 = 4.35520 × 10$^{-4}$ |
| | A6 = −4.06430 × 10$^{-5}$ |
| | A8 = 1.21470 × 10$^{-5}$ |
| | A10 = −1.11130 × 10$^{-6}$ |
| | A12 = 1.17180 × 10$^{-7}$ |
| Surface No. 9 | K = −8.06360 |
| | A4 = −8.87470 × 10$^{-4}$ |
| | A6 = 9.97940 × 10$^{-5}$ |
| | A8 = −3.31620 × 10$^{-5}$ |
| | A10 = 5.03500 × 10$^{-6}$ |
| | A12 = −2.63750 × 10$^{-7}$ |

Figure 5:
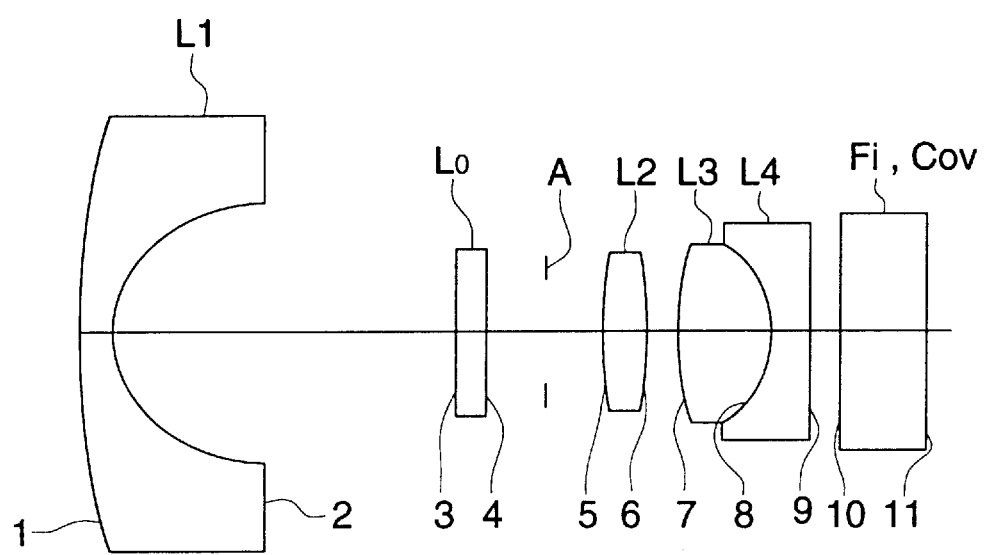
FIG. 5 is a sectional view of a lens in Example 3.
Figure 6A:
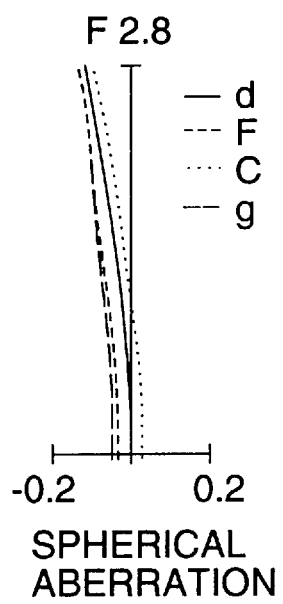
FIGS. 6(a), 6(b) and 6(c) are views of aberration in Example 3.
Figure 6B:
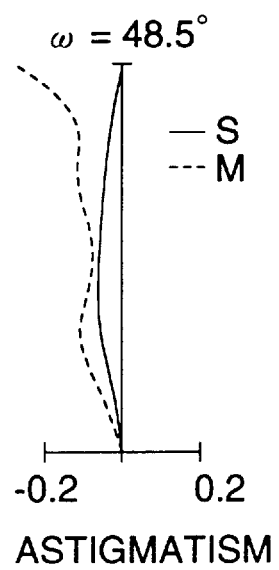
Figure 6C:
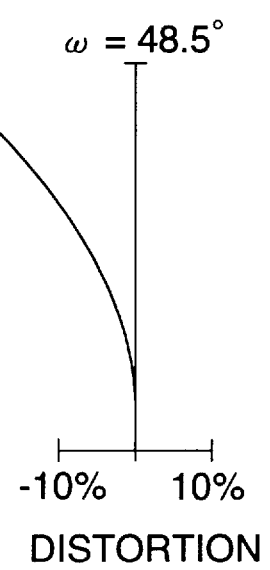

A sectional view of a lens is shown in FIG. 5, and views of aberrations are respectively shown in FIGS. 6(*a*), 6(*b*) and 6(*c*). In this connection, the object distance from the first surface of the lens to the object, in the view of aberration, is 500 mm.

[EXAMPLE 4]

Lens data when f=3.8, F2.8 and 2ω=89°, are shown in Table 7.

TABLE 7

| Surface No. | r | d | n$_d$ | V$_d$ | Remarks |
| --- | --- | --- | --- | --- | --- |
| 1 | 20.447 | 1.17 | 1.49200 | 57.0 | 1st lens L$_1$ (plastic lens) |
| 2 (aspherical) | 3.314 | 11.01 | | | |
| 3 | ∞ | 1.00 | 1.49200 | 57.0 | Diffraction type low-pass filter L$_0$ |
| 4 | ∞ | 3.60 | | | |
| 5 (aspherical) | 14.908 | 1.50 | 1.72916 | 54.7 | 2nd lens L$_2$ (glass lens) |
| 6 (aspherical) | −11.452 | 1.00 | | | |
| 7 (aspherical) | 9.066 | 3.00 | 1.49200 | 57.0 | 3rd lens L$_3$ (plastic lens) |
| 8 | −3.200 | 1.20 | 1.58300 | 30.0 | 4th lens L$_4$ (plastic lens) |
| 9 (aspherical) | 47.563 | 1.00 | | | |
| 10 | ∞ | 2.80 | 1.51633 | 64.1 | Infrared cut filter F$_i$ + CCD cover glass Cov |
| 11 | ∞ | | | | | aspherical coefficients are shown in Table 8.

TABLE 8

| Surface No. 2 | K = −6.21450 × 10$^{-1}$ |
| --- | --- |
| | A4 = −4.06410 × 10$^{-4}$ |
| | A6 = 2.27390 × 10$^{-4}$ |
| | A8 = −3.55780 × 10$^{-6}$ |
| | A10 = −7.21440 × 10$^{-7}$ |
| | A12 = 5.42530 × 10$^{-8}$ |
| Surface No. 5 | K = −2.03460 × 10$^{-3}$ |
| | A4 = −7.09980 × 10$^{-4}$ |
| | A6 = −1.30810 × 10$^{-4}$ |
| | A8 = −7.89530 × 10$^{-6}$ |
| | A10 = −1.17410 × 10$^{-6}$ |
| | A12 = 1.43710 × 10$^{-7}$ |

TABLE 8-continued

| Surface No. 6 | K = 4.17920 × 10$^{-3}$ |
| --- | --- |
| | A4 = −6.17370 × 10$^{-4}$ |
| | A6 = −1.52870 × 10$^{-4}$ |
| | A8 = −1.99110 × 10$^{-5}$ |
| | A10 = 3.01560 × 10$^{-6}$ |
| | A12 = −1.61890 × 10$^{-7}$ |
| Surface No. 7 | K = −2.33070 |
| | A4 = 1.06410 × 10$^{-3}$ |
| | A6 = −1.72490 × 10$^{-4}$ |
| | A8 = 1.18450 × 10$^{-5}$ |
| | A10 = 7.66190 × 10$^{-7}$ |
| | A12 = 1.72020 × 10$^{-8}$ |
| Surface No. 9 | K = −8.06350 |
| | A4 = 5.85660 × 10$^{-4}$ |
| | A6 = 2.21530 × 10$^{-5}$ |
| | A8 = −2.74960 × 10$^{-5}$ |
| | A10 = 5.16370 × 10$^{-6}$ |
| | A12 = −2.88970 × 10$^{-7}$ |

A sectional view of a lens is shown in FIG. 7, and views of aberrations are respectively shown in FIGS. 8(*a*), 8(*b*) and 8(*c*). In this connection, the object distance from the first surface of the lens to the object, in the view of aberration, is 500 mm.

[EXAMPLE 5]

Lens data when f=4.4, F2.8 and 2ω=81°, are shown in Table 9.

TABLE 9

| Surface No. | r | d | n$_d$ | V$_d$ | Remarks |
| --- | --- | --- | --- | --- | --- |
| 1 | 12.740 | 1.17 | 1.49200 | 57.0 | 1st lens L$_1$ (plastic lens) |
| 2 (aspherical) | 3.390 | 9.04 | | | |
| 3 | ∞ | 1.00 | 1.49200 | 57.0 | Diffraction type low-pass filter L$_0$ |
| 4 | ∞ | 3.60 | | | |
| 5 | 9.468 | 1.50 | 1.48749 | 70.2 | 2nd lens L$_2$ (glass lens) |
| 6 | −8.173 | 0.50 | | | |
| 7 (aspherical) | 7.128 | 3.20 | 1.49200 | 57.0 | 3rd lens L$_3$ (plastic lens) |
| 8 | −3.500 | 1.20 | 1.58300 | 30.0 | 4th lens L$_4$ (plastic lens) |
| 9 (aspherical) | −41.355 | 0.50 | | | |
| 10 | −10.290 | 1.20 | 1.58300 | 30.0 | 5th lens L$_5$ (plastic lens) |
| 11 | −74.509 | 1.00 | | | |
| 12 | ∞ | 2.80 | 1.51633 | 64.1 | Infrared cut filter F$_i$ + CCD cover glass Cov |
| 13 | ∞ | | | | | aspherical coefficients are shown in Table 10.

TABLE 10

| Surface No. 2 | K = −5.23440 × 10$^{-1}$ |
| --- | --- |
| | A4 = 3.79330 × 10$^{-4}$ |
| | A6 = 1.99370 × 10$^{-4}$ |
| | A8 = −5.88430 × 10$^{-6}$ |
| | A10 = −5.27920 × 10$^{-7}$ |
| | A12 = 8.18610 × 10$^{-8}$ |
| Surface No. 7 | K = −2.34380 |
| | A4 = 6.58330 × 10$^{-4}$ |
| | A6 = 5.71560 × 10$^{-5}$ |
| | A8 = −2.28590 × 10$^{-5}$ |
| | A10 = 4.65100 × 10$^{-6}$ |

TABLE 10-continued

| | |
|---|---|
| Surface No. 9 | A12 = −2.84990 × $10^{-7}$<br>K = −8.06350<br>A4 = −1.94400 × $10^{-4}$<br>A6 = 1.04830 × $10^{-4}$<br>A8 = −2.19950 × $10^{-5}$<br>A10 = 1.86970 × $10^{-6}$<br>A12 = −4.27370 × $10^{-8}$ |

Figure 9:
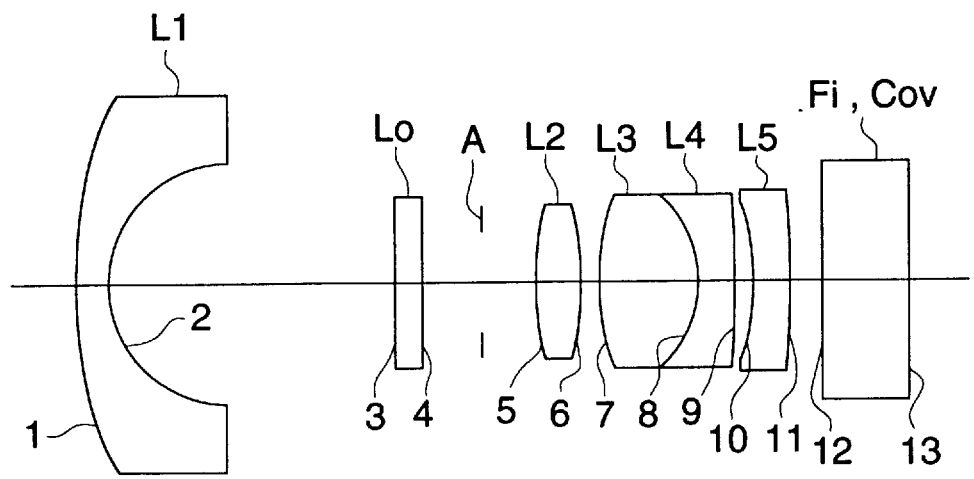
FIG. 9 is a sectional view of the lens in Example 5.
Figure 10:
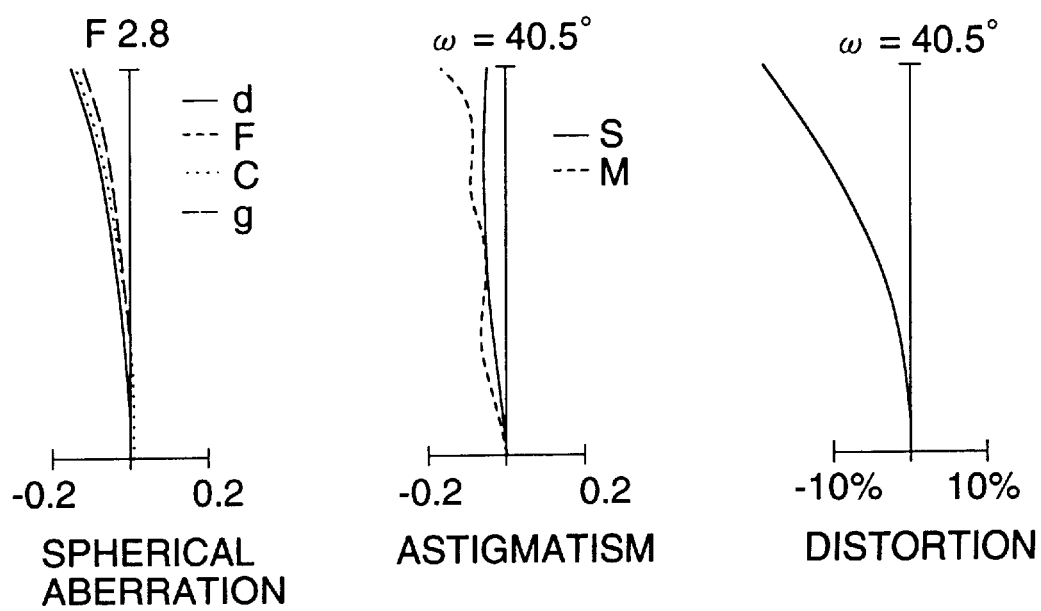
FIGS. 10(a), 10(b) and 10(c) are views of aberration in Example 5.

A sectional view of a lens is shown in FIG. 9, and views of aberrations are respectively shown in FIGS. 10(*a*), 10(*b*) and 10(*c*). In this connection, the object distance from the first surface of the lens to the object, in the view of aberration, is 500 mm.

[EXAMPLE 6]

Lens data when f=4.4, F2.8 and 2ω=81°, are shown in Table 11.

TABLE 11

| Surface No. | r | d | $n_d$ | $V_d$ | Remarks |
|---|---|---|---|---|---|
| 1 | 15.380 | 1.20 | 1.49200 | 57.0 | 1st lens $L_1$ (plastic lens) |
| 2 (aspherical) | 4.910 | 1.80 | | | |
| 3 | 17.990 | 1.20 | 1.49200 | 57.0 | 2nd lens $L_2$ (plastic lens) |
| 4 | 5.629 | 5.84 | | | |
| 5 | ∞ | 1.00 | 1.49200 | 57.0 | Diffraction type low-pass filter $L_0$ |
| 6 | ∞ | 3.60 | | | |
| 7 | 7.085 | 1.50 | 1.48749 | 70.2 | 3rd lens $L_3$ (glass lens) |
| 8 | −12.843 | 0.50 | | | |
| 9 (aspherical) | 5.536 | 3.20 | 1.49200 | 57.0 | 4th lens $L_4$ (plastic lens) |
| 10 | −3.500 | 1.20 | 1.58300 | 30.0 | 5th lens $L_5$ (plastic lens) |
| 11 (aspherical) | −112.655 | 0.50 | | | |
| 12 | −10.056 | 1.20 | 1.58300 | 30.0 | 6th lens $L_6$ (plastic lens) |
| 13 | 169.353 | 1.00 | | | |
| 14 | ∞ | 2.80 | 1.51633 | 64.1 | Infrared cut filter $F_i$ + CCD cover glass Cov |
| 15 | ∞ | | | | |

Aspherical coefficients are shown in Table 12.

TABLE 12

| | |
|---|---|
| Surface No. 2 | K = −3.83600 × $10^{-1}$<br>A4 = 1.10800 × $10^{-4}$<br>A6 = 1.60830 × $10^{-4}$<br>A8 = −1.40290 × $10^{-5}$<br>A10 = 8.16960 × $10^{-7}$<br>A12 = −1.13990 × $10^{-8}$ |
| Surface No. 9 | K = −2.29460<br>A4 = 1.95700 × $10^{-3}$<br>A6 = 2.31760 × $10^{-4}$<br>A8 = −6.87380 × $10^{-5}$<br>A10 = 1.03830 × $10^{-5}$<br>A12 = −5.16240 × $10^{-7}$ |
| Surface No. 11 | K = −8.06470<br>A4 = 3.08500 × $10^{-3}$<br>A6 = 2.72710 × $10^{-4}$<br>A8 = −1.29970 × $10^{-5}$<br>A10 = −1.26390 × $10^{-6}$<br>A12 = 3.93000 × $10^{-7}$ |

Figure 11:
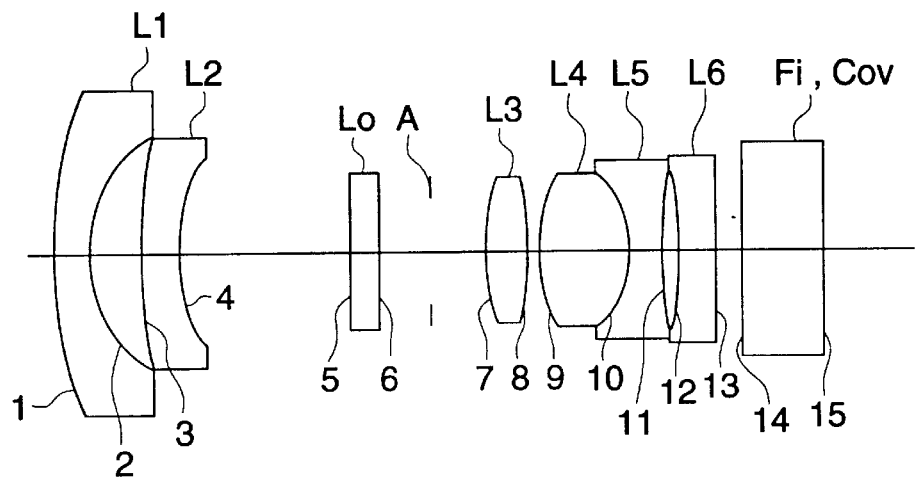
FIG. 11 is a sectional view of the lens in Example 6.
Figures 12A, 12B, 12C:
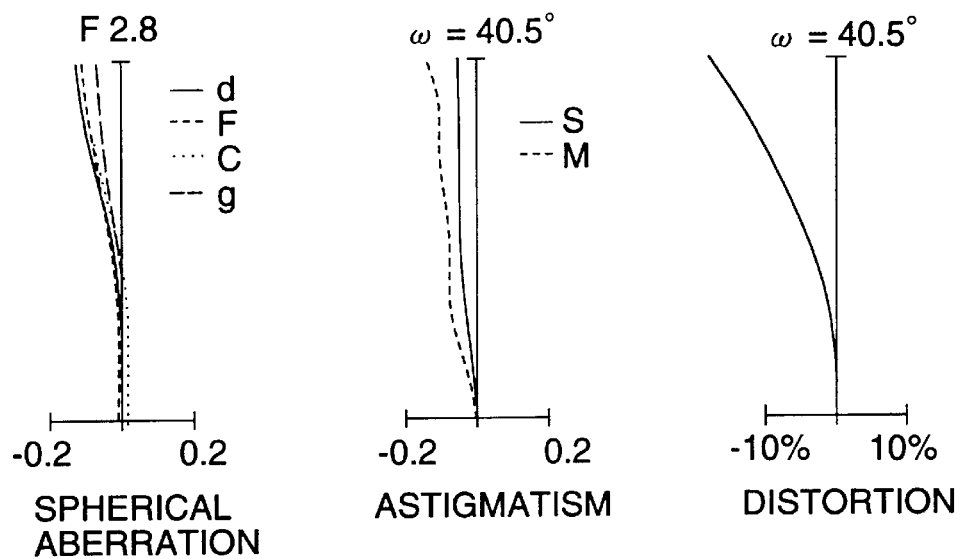
FIGS. 12(a), 12(b) and 12(c) are views of aberration in Example 6.

A sectional view of a lens is shown in FIG. 11, and views of aberrations are respectively shown in FIGS. 12(*a*), 12(*b*) and 12(*c*). In this connection, the object distance from the first surface of the lens to the object, in the view of aberration, is 500 mm.

[EXAMPLE 7]

Lens data when f=2.7, F2.8 and 2ω=84°, are shown in Table 13.

TABLE 13

| Surface No. | r | d | $n_d$ | $V_d$ | Remarks |
|---|---|---|---|---|---|
| 1 | −78.663 | 1.00 | 1.49200 | 57.0 | 1st lens $L_1$ (plastic lens) |
| 2 (aspherical) | 3.282 | 3.24 | | | |
| 3 | ∞ | 2.00 | 1.51400 | 64.0 | Infrared filter $F_i$ |
| 4 | ∞ | 1.00 | 1.49200 | 57.0 | Diffraction type low-pass filter $L_0$ |
| 5 | ∞ | 4.51 | | | |
| 6 | 5.278 | 0.90 | 1.72916 | 54.7 | 2nd lens $L_2$ (glass lens) |
| 7 | −26.156 | 0.60 | | | |
| 8 (aspherical) | 8.380 | 2.40 | 1.49200 | 57.0 | 3rd lens $L_3$ (plastic lens) |
| 9 | −2.677 | 0.90 | 1.58300 | 30.0 | 4th lens $L_4$ (plastic lens) |
| 10 (aspherical) | −26.229 | 1.00 | | | |
| 11 | ∞ | 0.80 | 1.51633 | 64.1 | CCD cover glass Cov |
| 12 | ∞ | | | | |

Aspherical coefficients are shown in Table 14.

TABLE 14

| | |
|---|---|
| Surface No. 2 | K = −5.41803 × $10^{-1}$<br>A4 = −2.31976 × $10^{-3}$<br>A6 − 1.68963 × $10^{-3}$<br>A8 = −2.09324 × $10^{-4}$<br>A10 = −2.72664 × $10^{-6}$<br>A12 = 1.96406 × $10^{-6}$ |
| Surface No. 8 | K = −2.34704<br>A4 = −1.12696 × $10^{-3}$<br>A6 = 5.88883 × $10^{-4}$<br>A8 = −3.02865 × $10^{-4}$<br>A10 = 7.08062 × $10^{-5}$<br>A12 = −5.49401 × $10^{-5}$ |
| Surface No. 10 | K = −8.06360<br>A4 = 2.34304 × $10^{-3}$<br>A6 = 1.06366 × $10^{-3}$<br>A8 = −6.18838 × $10^{-4}$<br>A10 = 1.54472 × $10^{-4}$<br>A12 = −1.25627 × $10^{-5}$ |

Figure 13:
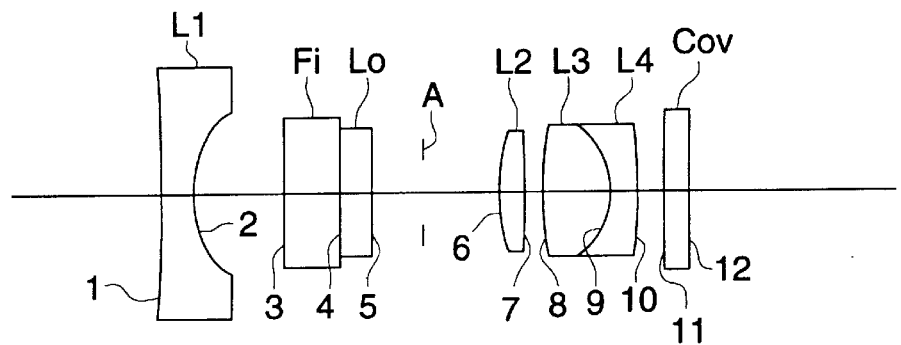
FIG. 13 is a sectional view of the lens in Example 7.
Figures 14A, 14B, 14C:
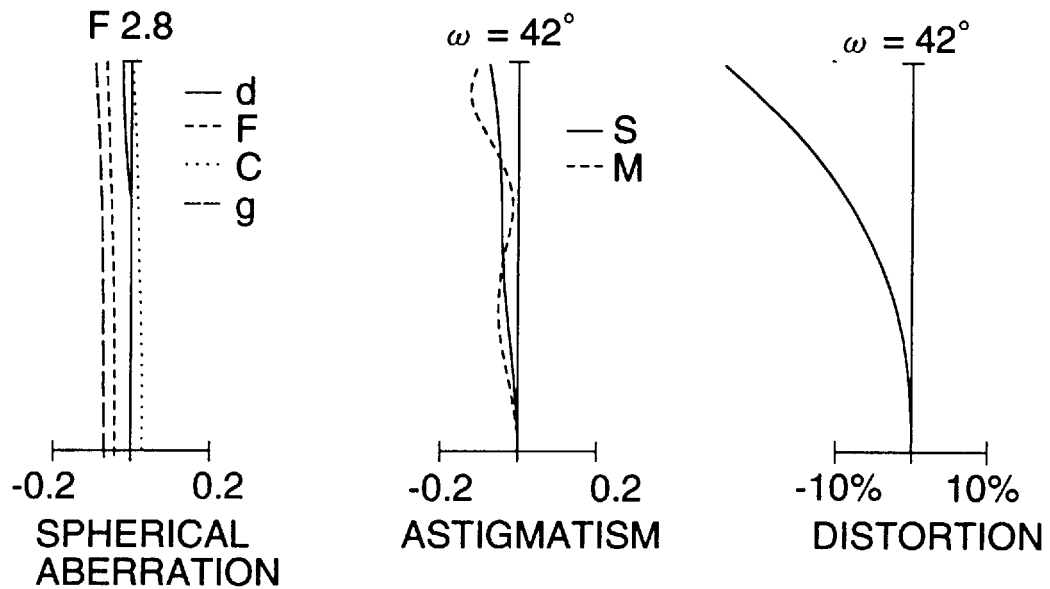
FIGS. 14(a), 14(b) and 14(c) are views in Example 7.

A sectional view of a lens is shown in FIG. 13, and views of aberrations are respectively shown in FIGS. 14(*a*), 14(*b*) and 14(*c*). In this connection, the distance from the first surface of the lens to the object, in the view of aberration, is 500 mm.

[EXAMPLE 8]

Lens data when f=3.2, F2.8 and 2ω=80°, are shown in Table 15.

TABLE 15

| Surface No. | r | d | $n_d$ | $V_d$ | Remarks |
|---|---|---|---|---|---|
| 1 | 7.534 | 1.00 | 1.49200 | 57.0 | 1st lens $L_1$ (plastic lens) |
| 2 (aspherical) | 2.328 | 5.00 | | | |

TABLE 15-continued

| Surface No. | r | d | $n_d$ | $V_d$ | Remarks |
|---|---|---|---|---|---|
| 3 | ∞ | 2.00 | 1.51400 | 73.0 | Infrared cut filter $F_i$ |
| 4 | ∞ | 1.00 | 1.49200 | 57.0 | Diffraction type low-pass filter $L_O$ |
| 5 | ∞ | 4.60 | | | |
| 6 | 5.907 | 1.60 | 1.48749 | 70.2 | 2nd lens $L_2$ (glass lens) |
| 7 | −5.907 | 0.50 | | | |
| 8 (aspherical) | 12.079 | 2.50 | 1.49200 | 57.0 | 3rd lens $L_3$ (plastic lens) |
| 9 | −2.534 | 1.00 | 1.58300 | 30.0 | 4th lens $L_4$ (plastic lens) |
| 10 (aspherical) | −492.074 | 1.00 | | | |
| 11 | ∞ | 0.80 | 1.51633 | 64.1 | CCD cover glass Cov |
| 12 | ∞ | | | | |

Aspherical coefficients are shown in Table 16.

TABLE 16

| Surface No.2 | $K = -3.57083 \times 10^{-1}$ |
|---|---|
| | $A4 = -2.42320 \times 10^{-3}$ |
| | $A6 = 1.10836 \times 10^{-3}$ |
| | $A8 = -1.90613 \times 10^{-4}$ |
| | $A10 = 1.22244 \times 10^{-5}$ |
| Surface No.8 | $K = -1.20921 \times 10$ |
| | $A4 = -2.16040 \times 10^{-3}$ |
| | $A6 = -2.63990 \times 10^{-4}$ |
| | $A8 = -8.87188 \times 10^{-6}$ |
| | $A10 = 4.56630 \times 10^{-6}$ |
| Surface No. 10 | $K = -8.73032 \times 10^{6}$ |
| | $A4 = -3.93597 \times 10^{-3}$ |
| | $A6 = -2.37686 \times 10^{-4}$ |
| | $A8 = 3.05305 \times 10^{-5}$ |
| | $A10 = -1.60686 \times 10^{-6}$ |

Figure 15:
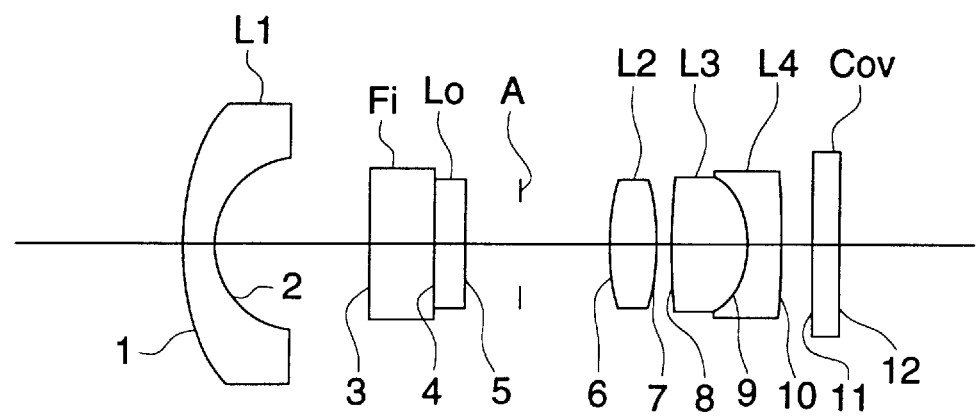
FIG. 15 is a sectional view of the lens in Example 8.
Figures 16A, 16B, 16C:
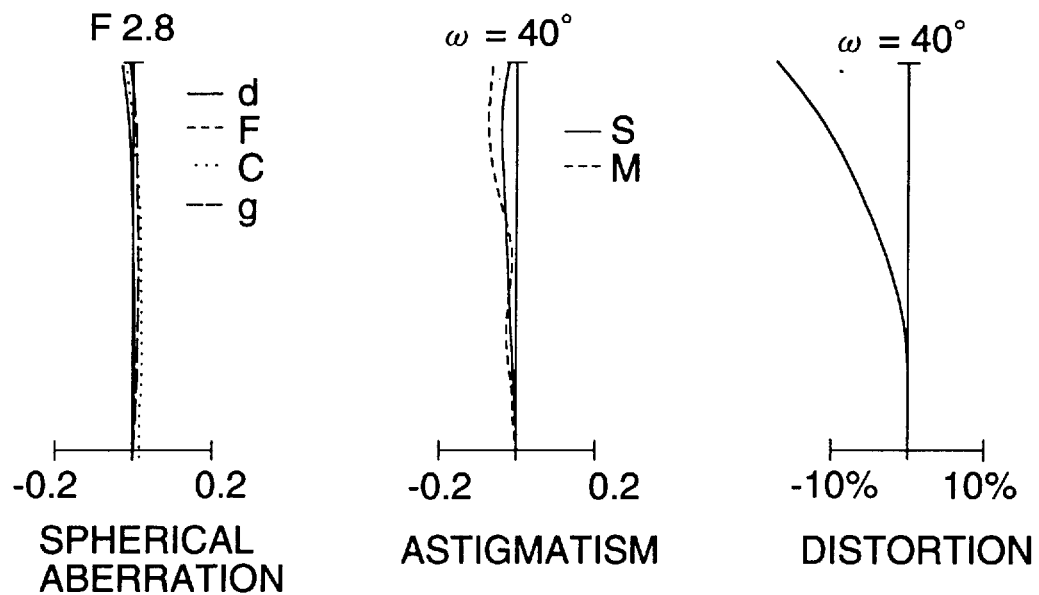
FIGS. 16(a), 16(b) and 16(c) are views of aberration in Example 8.

A sectional view of a lens is shown in FIG. 15, and views of aberrations are respectively shown in FIGS. 16(a), 16(b) and 16(c). In this connection, the distance from the first surface of the lens to the object, in the view of aberration, is 500 mm.

[EXAMPLE 9]

Lens data when f=2.7, F2.8 and 2ω=81°, are shown in Table 17.

TABLE 17

| Surface No. | r | d | $n_d$ | $V_d$ | Remarks |
|---|---|---|---|---|---|
| 1 | 27.429 | 1.00 | 1.49200 | 57.0 | 1st lens $L_1$ (plastic lens) |
| 2 (aspherical) | 2.757 | 6.27 | | | |
| 3 | ∞ | 2.00 | 1.51400 | 73.0 | Infrared cut filter $F_i$ |
| 4 | ∞ | 1.00 | 1.49200 | 57.0 | Diffraction type low-pass filter $L_O$ |
| 5 | ∞ | 4.60 | | | |
| 6 | 3.466 | 1.50 | 1.48749 | 70.2 | 2nd lens $L_2$ (glass lens) |
| 7 | −10.124 | 0.60 | | | |
| 8 (aspherical) | 11.650 | 2.40 | 1.49200 | 57.0 | 3rd lens $L_3$ (plastic lens) |
| 9 | −2.071 | 0.90 | 1.58300 | 30.0 | 4th lens $L_4$ (plastic lens) |
| 10 (aspherical) | 14.500 | 1.00 | | | |
| 11 | ∞ | 0.80 | 1.51633 | 64.1 | CCD cover glass Cov |
| 12 | ∞ | | | | |

Aspherical coefficients are shown in Table 18.

TABLE 18

| Surface No.2 | $K = -5.44931 \times 10^{-1}$ |
|---|---|
| | $A4 = -6.97030 \times 10^{-4}$ |
| | $A6 = 1.04128 \times 10^{-3}$ |
| | $A8 = -1.77260 \times 10^{-4}$ |
| | $A10 = 1.86613 \times 10^{-5}$ |
| | $A12 = -5.77527 \times 10^{-7}$ |
| Surface No.8 | $K = -2.34721$ |
| | $A4 = -5.86974 \times 10^{-3}$ |
| | $A6 = -4.86581 \times 10^{-4}$ |
| | $A8 = -1.07838 \times 10^{-4}$ |
| | $A10 = 4.34738 \times 10^{-5}$ |
| | $A12 = -3.89722 \times 10^{-6}$ |
| Surface No.10 | $K = -8.06334$ |
| | $A4 = -1.21451 \times 10^{-4}$ |
| | $A6 = -2.64847 \times 10^{-3}$ |
| | $A8 = 1.26720 \times 10^{-3}$ |
| | $A10 = -3.13096 \times 10^{-4}$ |
| | $A12 = 3.11631 \times 10^{-5}$ |

Figure 17:
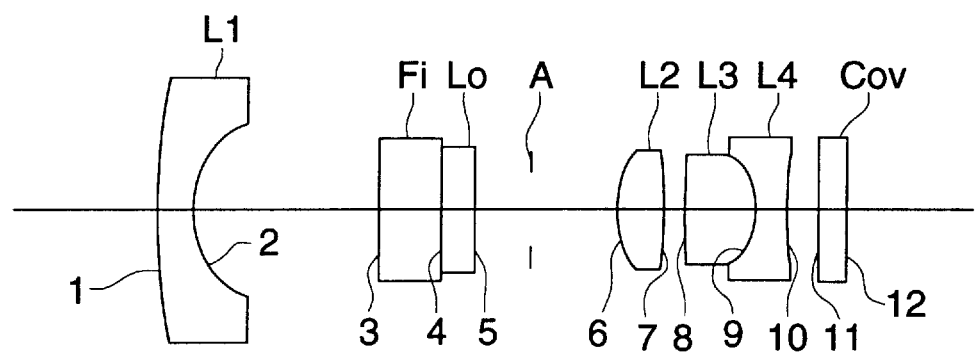
FIG. 17 is a sectional view of the lens in Example 9.
Figure 18A:
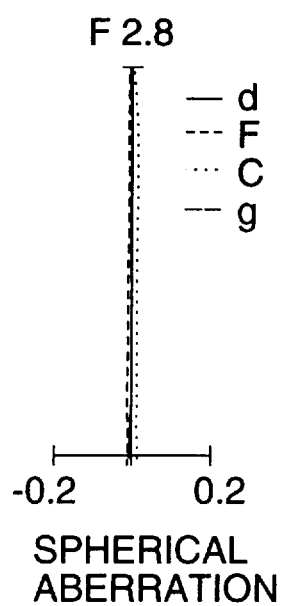
FIGS. 18(a), 18(b) and 18(c) are views of aberration in Example 9.
Figure 18B:
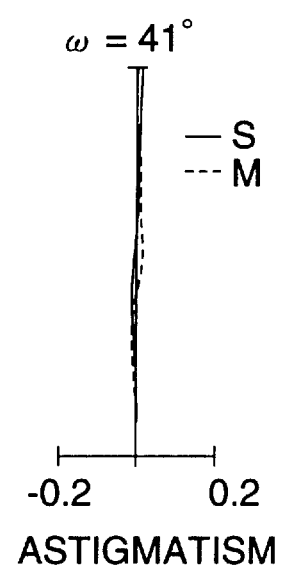
Figure 18C:
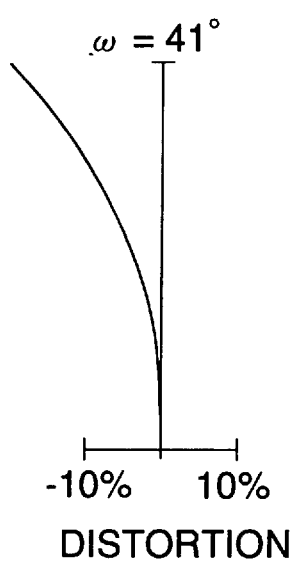

A sectional view of a lens is shown in FIG. 17, and views of aberrations are respectively shown in FIGS. 18(a), 18(b) and 18(c). In this connection, the distance from the first surface of the lens to the object, in the view of aberration, is 500 mm.

Finally, values of factors in each example are collectively shown in Table 19.

TABLE 19

| | 1st example | 2nd example | 3rd example | 4th example | 5th example | 6th example | 7th example | 8th example | 9th example |
|---|---|---|---|---|---|---|---|---|---|
| $v_N$ | 30 | 30 | 30 | 30 | — | — | 30 | 30 | 30 |
| D/f | 2.88 | 1.30 | 3.98 | 4.02 | 3.03 | 2.30 | 3.61 | 3.62 | 4.80 |
| $f_G/f$ | 1.99 | 1.37 | 2.42 | 2.39 | 2.10 | 2.18 | 2.26 | 1.98 | 2.78 |
| $v_P$ | 57 | 57 | 57 | 57 | — | — | 57 | 57 | 57 |
| $v_N$ | 30 | 30 | 30 | 30 | 30 | 30 | 30 | 30 | 30 |
| $f_B$ | 6.66 | 6.07 | 6.71 | 6.57 | 4.63 | 4.80 | 3.90 | 3.31 | 2.38 |
| $R_f$ | 200.0 | 108.5 | 66.21 | 47.56 | −74.51 | 169.4 | −26.23 | −492 | 14.50 |
| $f_B/R_f$ | 0.033 | 0.056 | 0.101 | 0.138 | −0.062 | 0.028 | −0.149 | −0.006 | 0.16 |
| $R_C$ | −3.2 | −3.48 | −3.2 | −3.2 | −3.5 | −3.5 | −2.677 | −2.53 | −2.071 |
| f | 4.4 | 6.0 | 3.8 | 3.8 | 4.4 | 4.4 | 2.70 | 3.21 | 2.68 |

TABLE 19-continued

|  | 1st example | 2nd example | 3rd example | 4th example | 5th example | 6th example | 7th example | 8th example | 9th example |
|---|---|---|---|---|---|---|---|---|---|
| $R_C/f$ | −0.72 | −0.58 | −0.84 | −0.84 | −0.80 | −0.80 | −0.99 | −0.79 | −0.77 |
| D | 12.69 | 7.77 | 15.13 | 15.28 | 13.31 | 10.11 | 9.74 | 11.59 | 12.86 |

Due to a retrofocus type lens of the present invention, in a lens in which approximately 4 lens elements are used as a basic structure; at most 6 or fewer lens elements are used; the angle of view is about 50°–100°, which is a wide angle; and the F-number is about 2–3 and bright, even if a plastic lens is widely used, a lens can be realized in which aberration is excellently corrected, and which is low in cost and the overall size is small. Accordingly, the lens is used for a video camera, a monitor camera, or the input lens for a personal computer.

Examples 10–12 of a retrofocus type lens of the present invention will be described below. Codes in each example means the following.

In each sectional view of the lens, the first lens group is shown by L1, the second lens group is shown by L2, the third lens group is shown by L3, and the fourth lens group is shown by L4.

The aspherical surface is shown by "*".

[EXAMPLE 10]

f=3.32 mm
$f_b$=3.10
F: 2.5
ω=40.1°

Lens data is shown in Table 20, a sectional view of the in FIG. 19.

TABLE 20

| Surface No. | r | d | $n_d$ | $v_d$ | Remarks |
|---|---|---|---|---|---|
| 1* | 100.000 | 1.20 | 1.49700 | 55.8 | plastic lens |
| 2 | 3.130 | 5.00 |  |  |  |
| 3 | ∞ | 1.70 | 1.49200 | 57.0 | Filter |
| 4 | ∞ | 4.30 |  |  |  |
| 5 | 7.023 | 2.40 | 1.60311 | 60.7 | glass lens |
| 6 | −7.023 | 0.60 |  |  |  |
| 7* | −6.642 | 1.00 | 1.58300 | 30.0 | plastic lens |
| 8 | −29.844 | 0.20 |  |  |  |
| 9* | 4.747 | 2.60 | 1.49700 | 55.8 | plastic lens |
| 10* | −4.100 | 0.20 |  |  |  |
| 11 | −5.268 | 0.70 | 1.84666 | 23.8 | glass lens |
| 12 | 96.820 | 1.00 |  |  |  |
| 13 | ∞ | 0.80 | 1.51633 | 64.1 | Cover glass |
| 14 | ∞ |  |  |  |  |

Aspherical coefficients are shown in Table 21.

TABLE 21

1st surface

K = 0.0
A4 = 3.69308 × 10⁻⁴
A6 = 1.55092 × 10⁻⁵
A8 = −1.07714 × 10⁻⁶
A10 = 2.70633 × 10⁻⁸

TABLE 21-continued

7th surface

K = 0.0
A4 = 1.08415 × 10⁻³
A6 = −2.59208 × 10⁻⁴
A8 = −8.24945 × 10⁻⁶

9th surface

K = 0.0
A4 = −3.43277 × 10⁻³
A6 = 1.49724 × 10⁻⁴
A8 = 5.36412 × 10⁻⁶

10th surface

K = 0.0
A4 = 1.53915 × 10⁻³
A6 = 4.71653 × 10⁻⁵
A8 = 1.64258 × 10⁻⁵

The values corresponding to the conditional relationships (15), (16) and (17) are as follows.

$(1-m_3)^2/(m_2^2 \cdot m_3^2)=3.16$ $v_g=60.7$ $D/f=3.14$

Further, views of aberrations are shown in FIGS. 20(*a*), 20(*b*) and 20(*c*).

[EXAMPLE 11]

f=3.30 mm
$f_b$=2.81
F:2.5
ω=41.1°

Lens data is shown in Table 22, a sectional view of the lens is shown in FIG. 21.

TABLE 22

| Surface No. | r | d | $n_d$ | $v_d$ | Remarks |
|---|---|---|---|---|---|
| 1* | 44.594 | 1.00 | 1.49200 | 57.0 | plastic lens |
| 2 | 3.047 | 5.00 |  |  |  |
| 3 | ∞ | 1.70 | 1.49200 | 57.0 | Filter |
| 4 | ∞ | 4.30 |  |  |  |
| 5 | 3.521 | 2.50 | 1.49700 | 81.6 | glass lens |
| 6 | −9.754 | 0.20 |  |  |  |
| 7* | 6.935 | 1.50 | 1.49200 | 57.0 | plastic lens |
| 8* | −8.222 | 0.30 |  |  |  |
| 9 | −4.826 | 1.00 | 1.84666 | 23.8 | glass lens |
| 10 | 113.237 | 1.00 |  |  |  |
| 11 | ∞ | 0.80 | 1.51633 | 64.1 | Cover glass |
| 12 | ∞ |  |  |  |  |

Aspherical coefficients are shown in Table 23.

TABLE 23

1st surface

K = 0.0
A4 = 1.92230 × 10$^{-4}$
A6 = 1.08217 × 10$^{-5}$
A8 = −5.42384 × 10$^{-7}$
A10 = 1.81628 × 10$^{-8}$

7th surface

K = 0.0
A4 = −5.66954 × 10$^{-3}$
A6 = −9.08743 × 10$^{-4}$
A8 = −6.77044 × 10$^{-5}$

8th surface

K = 0.0
A4 = −1.57055 × 10$^{-3}$
A6 = −9.92291 × 10$^{-4}$
A8 = 1.49700 × 10$^{-4}$

The values corresponding to the conditional relationships (15), (16) and (17) are as follows.

$(1-m_3)^2/(m_2^2 \cdot m_3^2) = 2.82$ $\nu_g = 81.6$ $D/f = 3.16$

Further, views of aberrations are shown in FIGS. 22(*a*), 22(*b*) and 22(*c*).

[EXAMPLE 12]

f=3.30 mm
f$_b$=2.06
F:2.5
ω=40.2°

Figure 23:
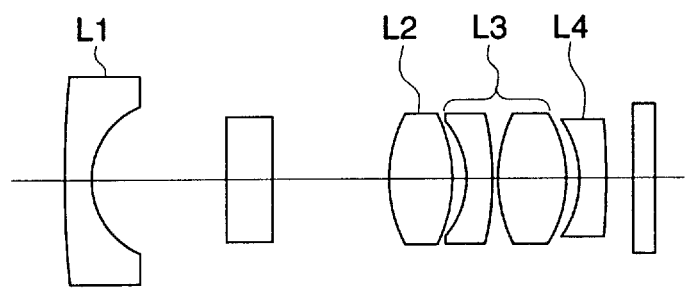
FIG. 23 is a sectional view of the lens in Example 12.

Lens data is shown in Table 24, while a sectional view of the lens is shown in FIG. 23.

TABLE 24

| Surface No. | r | d | n$_d$ | ν$_d$ | Remarks |
|---|---|---|---|---|---|
| 1* | 687.805 | 1.00 | 1.49200 | 57.0 | plastic lens |
| 2 | 3.037 | 5.00 | | | |
| 3 | ∞ | 1.70 | 1.49200 | 57.0 | Filter |
| 4 | ∞ | 4.30 | | | |
| 5 | 5.108 | 2.40 | 1.60311 | 60.7 | glass lens |
| 6 | −5.224 | 0.50 | | | |
| 7* | −3.751 | 1.00 | 1.58300 | 30.0 | plastic lens |
| 8 | −10.272 | 0.20 | | | |
| 9 | 6.464 | 2.50 | 1.49200 | 57.0 | plastic lens |
| 10* | −4.619 | 0.50 | | | |
| 11 | −3.759 | 1.00 | 1.84666 | 23.8 | glass lens |
| 12 | −21.191 | 1.00 | | | |
| 13 | ∞ | 0.80 | 1.51633 | 64.1 | Cover glass |
| 14 | ∞ | | | | |

Aspherical coefficients are shown in Table 25.

TABLE 25

1st surface

K = 0.0
A4 = 6.11713 × 10$^{-4}$
A6 = −8.43925 × 10$^{-7}$
A8 = −1.51377 × 10$^{-7}$
A10 = 9.03392 × 10$^{-9}$

7th surface

K = 0.0
A4 = −1.22546 × 10$^{-3}$
A6 = 9.03960 × 10$^{-5}$
A8 = 5.27629 × 10$^{-6}$

10th surface

K = 0.0
A4 = −5.03391 × 10$^{-4}$
A6 = 2.64475 × 10$^{-4}$
A8 = −1.23768 × 10$^{-5}$

The values corresponding to the conditional relationships (15), (16) and (17) are as follows.

$(1-m_3)^2/(m_2^2 \cdot m_3^2) = 0.37$ $\nu_g = 60.7$ $D/f = 3.16$

Further, views of aberrations are shown in FIGS. 24(*a*), 24(*b*) and 24(*c*).

According to a retrofocus type lens of the present invention, a wide angle lens can be obtained, which is appropriate for a visual telephone, and an image input device of a personal computer, and which is small in size, low in cost, and has an excellent image forming performance.

Examples 13, 14 and 15 will be shown below.

In this connection, in each sectional view, the 1st lens is L1, the 2nd lens is L2, the 3rd lens is L3, the 4th lens is L4, and the 5th lens is L5.

TABLE 26

| f = 3.28 mm F: 2.5 ω = 40.9° | | | | | |
|---|---|---|---|---|---|
| Surface No. | r | d | n$_d$ | ν$_d$ | Remarks |
| 1* | 25.049 | 1.20 | 1.49200 | 57.0 | pastic lens |
| 2 | 3.100 | 2.56 | | | |
| 3 | ∞ | 1.70 | 1.49200 | 57.0 | Filter |
| 4 | ∞ | 1.00 | | | |
| 5 | −3.666 | 2.50 | 1.49200 | 57.0 | plastic lens |
| 6* | −3.250 | 2.10 | | | |
| 7 | (aperture-stop) | 2.50 | | | |
| 8 | 6.400 | 2.40 | 1.60311 | 60.7 | glass lens |
| 9 | −6.400 | 0.50 | | | |
| 10 | −5.031 | 1.20 | 1.58300 | 30.0 | plastic lens |
| 11 | 4.806 | 2.60 | 1.49200 | 57.0 | plastic lens |
| 12* | −4.401 | 1.00 | | | |

TABLE 26-continued $f = 3.28$ mm F: 2.5 $\omega = 40.9°$

| Surface No. | r | d | $n_d$ | $v_d$ | Remarks |
|---|---|---|---|---|---|
| 13 | ∞ | 1.00 | 1.51633 | 64.1 | Cover glass |
| 14 | ∞ | | | | |

Figure 25:
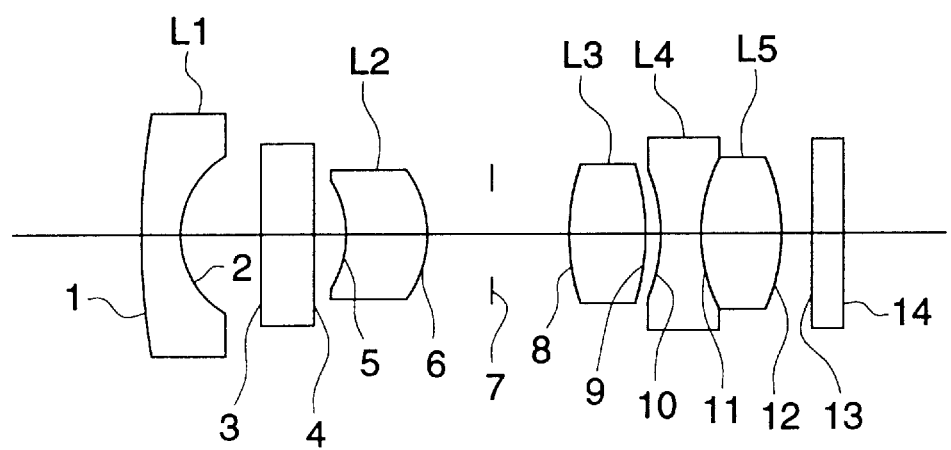
FIG. 25 is a sectional view of Example 13.

*aspherical surface
1st surface
$K = 0.0$
$A4 = 2.82853 \times 10^{-4}$
$A6 = -2.31874 \times 10^{-5}$
$A8 = -5.47790 \times 10^{-7}$
$A10 = 2.55540 \times 10^{-8}$
6th surface
$K = 0.0$
$A4 = 1.99625 \times 10^{-3}$
$A6 = 8.75142 \times 10^{-5}$
$A8 = 1.73480 \times 10^{-5}$
12th surface
$K = 0.0$
$A4 = 3.56447 \times 10^{-3}$
$A6 = -4.85901 \times 10^{-5}$
$A8 = 4.55959 \times 10^{-6}$ In a lens in Example 13 shown in a sectional view in FIG. 25, $$v_1 - v_2 = 0$$

$$\sum_{i=3}^{5} \frac{f}{f_i v_i} = -0.0059$$

and these values satisfy the relationships (23) and (24). Aspherical lenses, in which the thickness of the lens is larger at the periphery portion than a case where the lens surface is structured with the curvature near the optical axis, are used for the 2nd lens and the 5th lens. Further, the 3rd lens is made of glass, and other lenses are made of plastic.

FIGS. 26(a), 26(b), 26(c) and 26(d) respectively show aberrations in Example 13.

(EXAMPLE 14)

TABLE 27

$f = 3.83$ mm F: 1.8 $\omega = 37.8°$

| Surface No. | r | d | $n_d$ | $v_d$ | Remarks |
|---|---|---|---|---|---|
| 1* | −7.093 | 1.20 | 1.49200 | 57.0 | plastic lens |
| 2 | 4.019 | 2.50 | | | |
| 3 | ∞ | 1.70 | 1.49200 | 57.0 | Filter |
| 4 | ∞ | 1.00 | | | |
| 5 | −93.264 | 2.00 | 1.49200 | 57.0 | plastic lens |
| 6* | −4.571 | 2.00 | | | |
| 7 | (aperture-stop) | 2.00 | | | |
| 8 | 5.128 | 2.40 | 1.48749 | 70.2 | glass lens |
| 9 | −9.832 | 0.50 | | | |
| 10 | −6.473 | 1.20 | 1.58300 | 30.0 | plastic lens |
| 11 | 4.609 | 0.30 | | | |
| 12 | 5.971 | 2.60 | 1.49200 | 57.0 | plastic lens |
| 13* | −4.211 | 1.00 | | | |

TABLE 27-continued $f = 3.83$ mm F: 1.8 $\omega = 37.8°$

| Surface No. | r | d | $n_d$ | $v_d$ | Remarks |
|---|---|---|---|---|---|
| 14 | ∞ | 1.00 | 1.51633 | 64.1 | Cover glass |
| 15 | ∞ | | | | |

Figure 27:
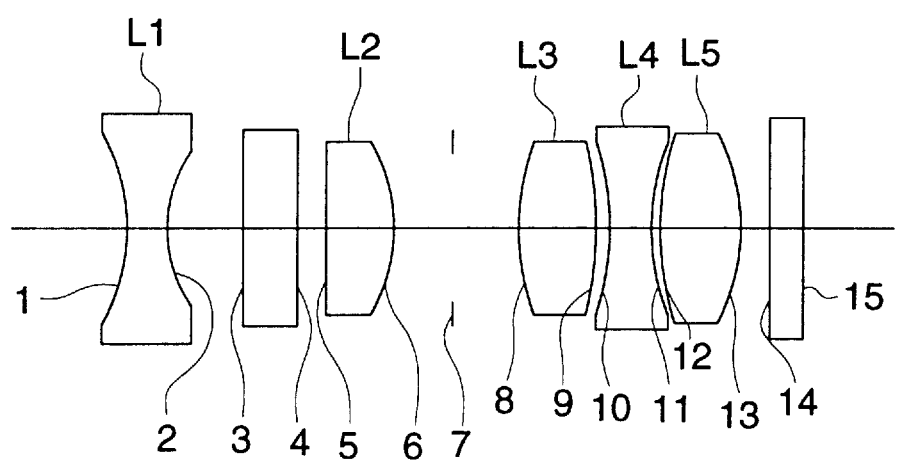
FIG. 27 is a sectional view in Example 14.
Figure 28:
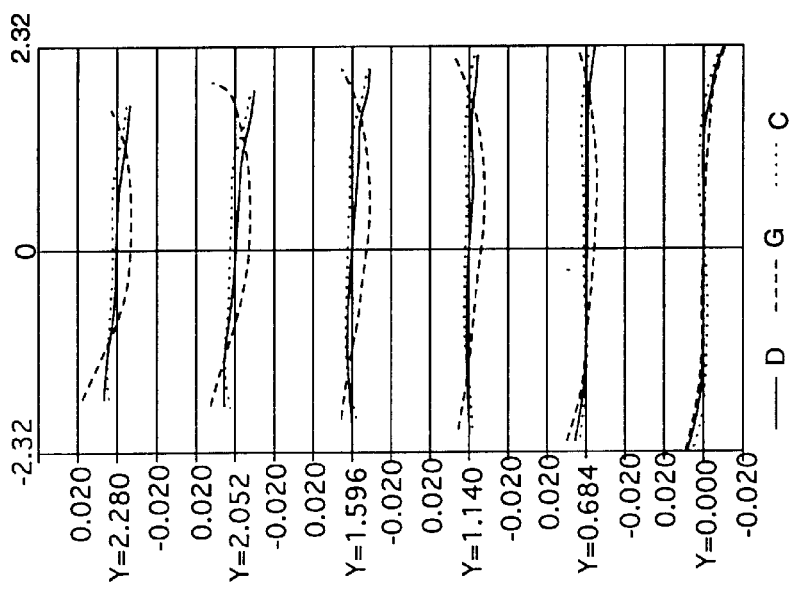
FIGS. 28(a), 28(b), 28(c) and 28(d) are views of aberrations in Example 14.
Figure 28:
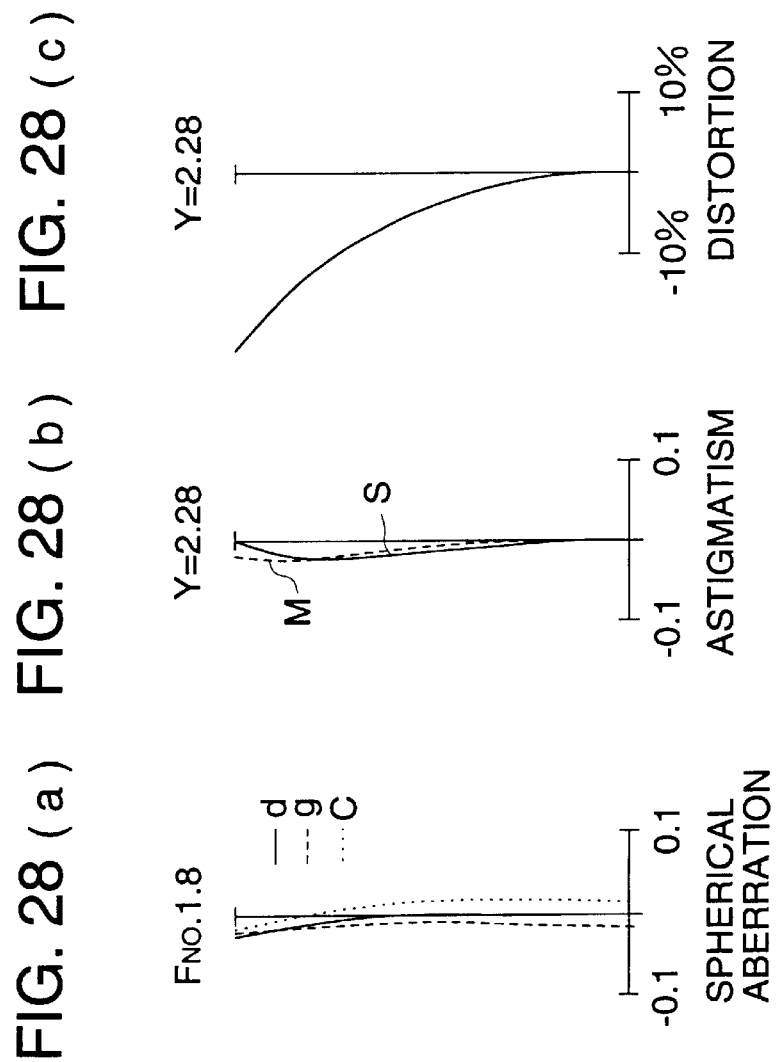
Figure 29:
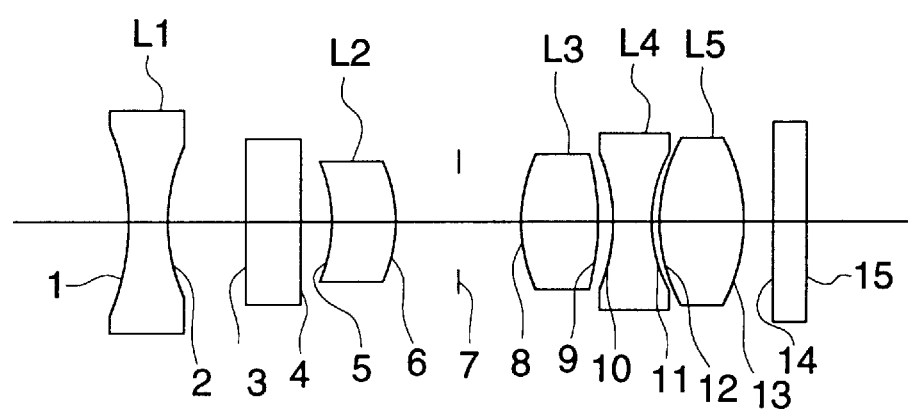
FIG. 29 is a sectional view in Example 15.

*aspherical surface
1st surface
$K = 0.0$
$A4 = 4.56784 \times 10^{-4}$
$A6 = -4.69333 \times 10^{-5}$
$A8 = 3.99426 \times 10^{-6}$
$A10 = -1.16466 \times 10^{-7}$
6th surface
$K = 0.0$
$A4 = 8.63548 \times 10^{-4}$
$A6 = -8.72028 \times 10^{-7}$
$A8 = 1.72446 \times 10^{-6}$
13th surface
$K = 0.0$
$A4 = 2.88614 \times 10^{-3}$
$A6 = 4.93029 \times 10^{-6}$
$A8 = -2.33918 \times 10^{-6}$ In a lens in Example 14 shown in a sectional view in FIG. 27, $$v_1 - v_2 = 0$$

$$\sum_{i=3}^{5} \frac{f}{f_i v_i} = -0.0090$$

and these values satisfy the relationships (23) and (24). Aspherical lenses, in which the thickness of the lens is larger at the periphery portion than a case where the lens surface is structured with the curvature near the optical axis, are used for the 2nd lens and the 5th lens. Further, the 3rd lens is made of glass, and all other lenses are made of plastic.

FIGS. 28(a), 28(b), 28(c) and 28(d) respectively show aberrations in Example 14.

(EXAMPLE 15)

TABLE 28

$f = 3.80$ mm F: 2.8 $\omega = 36.7°$

| Surface No. | r | d | $n_d$ | $v_d$ | Remarks |
|---|---|---|---|---|---|
| 1* | −7.448 | 1.20 | 1.49200 | 57.0 | plastic lens |
| 2 | 6.258 | 2.50 | | | |
| 3 | ∞ | 1.70 | 1.49200 | 57.0 | Filter |
| 4 | ∞ | 1.00 | | | |
| 5 | −5.187 | 2.00 | 1.58300 | 30.0 | plastic lens |
| 6* | −4.110 | 2.00 | | | |
| 7 | (aperture-stop) | 2.00 | | | |
| 8 | 4.340 | 2.40 | 1.48749 | 70.2 | glass lens |
| 9 | −7.738 | 0.50 | | | |
| 10 | −5.383 | 1.20 | 1.58300 | 30.0 | plastic lens |
| 11 | 4.082 | 0.30 | | | |
| 12 | 5.054 | 2.60 | 1.49200 | 57.0 | plastic lens |
| 13* | −4.211 | 1.00 | | | |

TABLE 28-continued f = 3.80 mm F: 2.8 ω = 36.7°

| Surface No. | r | d | $n_d$ | $v_d$ | Remarks |
|---|---|---|---|---|---|
| 14 | ∞ | 1.00 | 1.51633 | 64.1 | Cover glass |
| 15 | ∞ | | | | |

*aspherical surface
1st surface
K = 0.0
A4 = 1.38244 × 10$^{-3}$
A6 = −1.04222 × 10$^{-4}$
A8 = 7.36781 × 10$^{-6}$
A10= −2.16626 × 10$^{-7}$
6th surface
K = 0.0
A4 = 1.20923 × 10$^{-3}$
A6 = 4.38173 × 10$^{-5}$
A8 = −4.16684 × 10$^{-7}$
13th surface
K = 0.0
A4 = 3.13264 × 10$^{-3}$
A6 = 3.62625 × 10$^{-5}$
A8 = 1.04597 × 10$^{-6}$ In a lens in Example 15 shown in a sectional view in FIG. 26, $$v_1 - v_2 = 27$$

$$\sum_{i=3}^{5} \frac{f}{f_i v_i} = -0.0115,$$

and these values satisfy the relationships (21) and (22). Aspherical lenses, in which the thickness of the lens is larger at the periphery portion than a case where the lens surface is structured with the curvature near the optical axis, are used for the 2nd lens and the 5th lens. Further, the 3rd lens is made of glass, and all other lenses are made of plastic.

FIGS. 30(*a*), 30(*b*), 30(*c*) and 30(*d*) respectively show aberrations in Example 15.

As described above, according to the present invention, a retrofocus type lens can be obtained, in which the overall size is smaller, the weight is smaller, and the image forming performance is excellent.

Example 16 of another lens will be described below. Codes in the example means the following.

[EXAMPLE 16]

Figure 31:
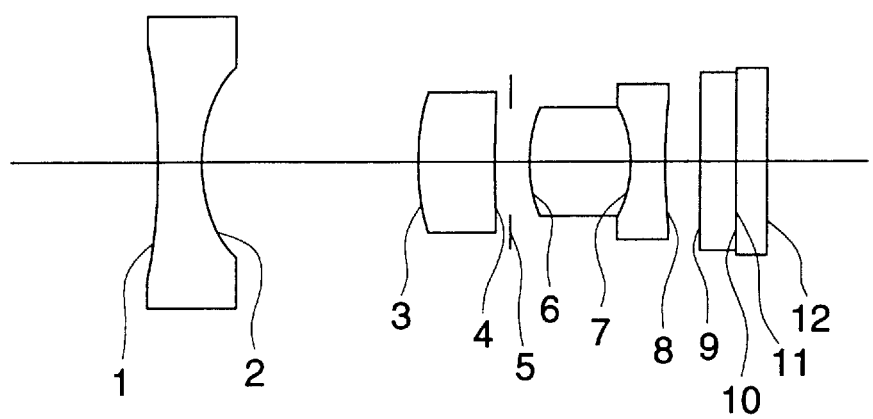
FIG. 31 is an optical sectional view in Example 16.

An optical sectional view of Example 16 is shown in FIG. 31.

Next, numerical values of Example 16 are shown in Table 9.

TABLE 29 f = 4.08 mm F 2.8 ω = 31.2° $f_B$ = 2.79 mm

| Surface No. | r | d | $n_d$ | $v_d$ | Remarks |
|---|---|---|---|---|---|
| 1* | −17.308 | 1.20 | 1.49700 | 55.8 | plastic lens |
| 2 | 3.551 | 6.00 | | | |
| 3 | 4.309 | 2.20 | 1.48749 | 70.2 | Glass lens |
| 4 | 57.767 | 0.50 | | | |
| 5 | (aperture-stop) | 0.50 | | | |
| 6* | 3.909 | 2.80 | 1.49700 | 55.8 | plastic lens |

TABLE 29-continued f = 4.08 mm F 2.8 ω = 31.2° $f_B$ = 2.79 mm

| Surface No. | r | d | $n_d$ | $v_d$ | Remarks |
|---|---|---|---|---|---|
| 7 | −3.300 | 1.00 | 1.58300 | 30.0 | plastic lens |
| 8* | 104.311 | 1.00 | | | |
| 9 | ∞ | 1.00 | 1.51633 | 64.1 | filter |
| 10 | ∞ | 0.01 | | | |
| 11 | ∞ | 0.80 | 1.51633 | 64.1 | cover glass |
| 12 | ∞ | | | | |

*aspherical surface
1st surface
K = 0.0
A4 = 1.16007 × 10$^{-3}$
A6 = −9.16717 × 10$^{-5}$
A8 = 7.47802 × 10$^{-6}$
A10 = −2.24845 × 10$^{-7}$
6th surface
K = 0.0
A4 = −1.09486 × 10$^{-3}$
A6 = −1.56204 × 10$^{-4}$
A8 = −6.53646 × 10$^{-6}$
8th surface
K = 0.0
A4 = 7.25776 × 10$^{-3}$
A6 = −5.41265 × 10$^{-4}$
A8 = 4.91543 × 10$^{-4}$
A10 = −9.86432 × 10$^{-5}$
fp/fc = 0.97
$r_A/r_B$ =0.07

Figure 32:
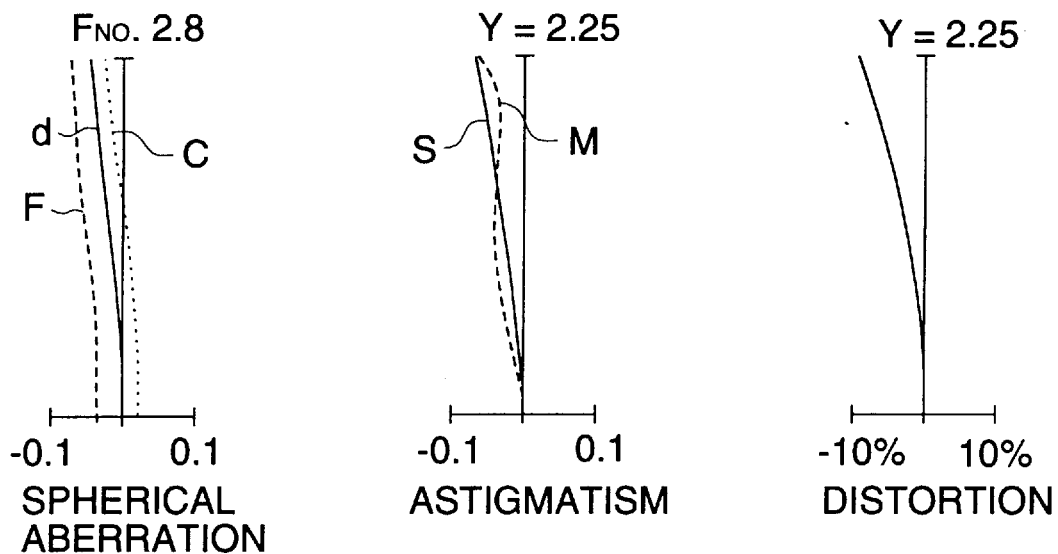
FIGS. 32(a), 32(b), 32(c) and 32(d) are views of aberrations in Example 16.
Figure 32:
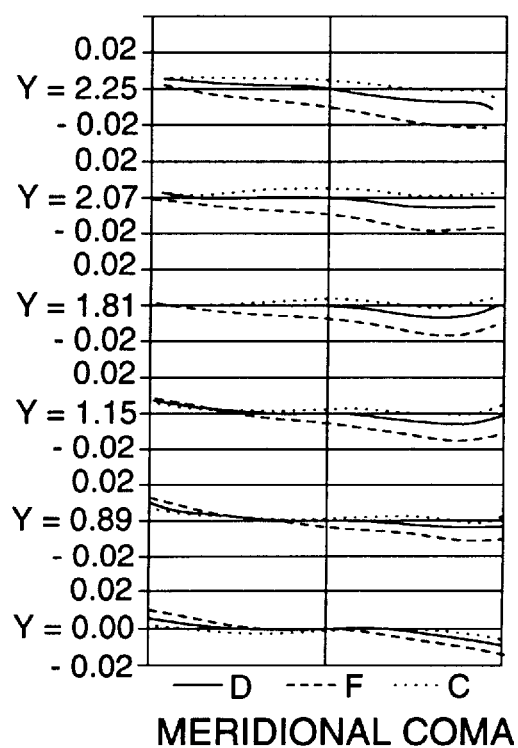

Views of aberration of Example 16 are shown in FIGS. 32(*a*), 32(*b*), 32(*c*) and 32(*d*). As shown in the views, aberrations are excellently corrected.

In the above Example 16 of the present invention, only one positive lens of the optical system is composed of a glass lens, and other lenses are composed of plastic lenses. In this manner, when one positive lens is composed of glass, the change of focal position due to temperature change can be reduced.

Further, in Example 16, 2 parallel planes arranged closest to the image-side respectively correspond to a filter and a CCD cover glass. As shown in each example, even when almost all lenses in the optical system are composed of plastic, an optical system is obtained in which each aberration is rightly corrected with balance.

An optical system of the present invention is structured as described above, and thereby, a lens can be obtained, in which the overall size is smaller, the weight is smaller, cost is lower, and which has excellent performance.

What is claimed is:

1. A retrofocus type lens system comprising from an object side:
   (a) a front lens group including at least one negative lens; and
   (b) a rear lens group, including at least two positive lenses and a negative lens,
      wherein a positive lens of the rear lens group is provided closest to an object side and is made of glass,
      and wherein more than half of the lenses of said front and rear lens groups are made of plastic, and satisfy the following conditional expression, $$0.7 < f_G/f < 4.0$$

where $f_G$ represents a focal length of said positive lens of the rear lens group provided closest to the object side, and f represents a focal length of the retrofocus type lens system, further satisfying the following conditional expressions:

$$25 < V_N < 37$$

and $$0.8 < D/f < 7.0$$

where $V_N$ represents an Abbe's number of d-line of said negative lens in the rear lens group, and D represents an equivalent air distance between a surface of the front lens group provided closest to the image side and a surface of the rear lens group provided closest to the object side.

2. The retrofocus type lens system of claim 1, wherein said rear lens group includes a cemented lens in which a positive lens and a negative lens are cemented together.

3. The retrofocus type lens system of claim 1, wherein said front lens group consists of one negative lens, said rear lens group, in the order named from the object side, consists of a positive lens and a cemented lens in which a positive lens and a negative lens are cemented together, and wherein at least one surface of the lenses made of plastic is aspherical.

4. The retrofocus type lens system of claim 2, wherein said cemented lens is plastic.

5. The retrofocus type lens system of claim 1 further comprising a diffraction type low-pass filter.

6. The retrofocus type lens system of claim 5 further comprising a fixed stop for cutting an off-axial light positioned either on the object side or the image side of the diffraction type low-pass filter.

7. The retrofocus type lens system of claim 1 further comprising an aperture-stop positioned on the object side of the positive lens of said rear lens group which is disposed closest to the object side.

8. A retrofocus type lens system comprising from an object side:

(a) a front lens group including at least one negative lens; and (b) a rear lens group, Including at least two positive lenses and a negative lens,
wherein a positive lens of the rear lens group is provided closest to an object side and is made of glass,
and wherein more than half of the lenses of said front and rear lens groups are made of plastic, and satisfy the following conditional expression, $$0.7 < f_G/f < 4.0$$

where $f_G$ represents a focal length of said positive lens of the rear lens group provided closest to the object side, and f represents a focal length of the retrofocus type lens system,
wherein said front lens group consists of a plastic lens having a negative refracting power, said rear lens group includes, from the object side, a double-convex glass lens and a plastic lens subgroup composed of one or more plastic lenses, in which the plastic lens subgroup has a positive refracting power, and said rear lens group satisfies the following conditional expressions, $$0.3 \leq (1-m_p)^2/(m_g^2 \cdot m_p^2) \leq 3.5$$

and $$48 \leq V_g$$

where $m_g$ represents a paraxial lateral magnification of the double-convex glass lens of said rear lens group, $m_p$ represents a paraxial lateral magnification of the plastic lens subgroup of said rear lens group, and $V_g$ represents an Abbe's number of d-line of the double-convex glass lens of said rear lens group.

9. The retrofocus type lens system of claim 8, wherein said rear lens group consists, from the object side, of the double-convex glass lens, the plastic lens subgroup having a positive refracting power composed of one or more plastic lenses, and a negative lens.

10. The retrofocus type lens system of claim 8, further satisfying the following conditional expression, $$1.5 < D/f < 5.0$$

where D represents an equivalent air distance between a surface of the front lens group provided closest to the image side and a surface of the rear lens group provided closest to the object side.

11. The retrofocus type lens system of claim 8, wherein said plastic lens subgroup of said rear lens group comprises one negative lens and one positive lens.

12. The retrofocus type lens system of claim 8, wherein said plastic lens subgroup of said rear lens group comprises one positive lens.

13. The retrofocus type lens system of claim 8 further comprising a diffraction type low-pass filter.

14. The retrofocus type lens system of claim 13 further comprising a fixed stop for cutting an off-axial light positioned either on the object side or the image side of the diffraction type low-pass filter.

15. A retrofocus type lens system comprising from an object side;

(a) a front lens group including at least one negative lens; and (b) a rear lens group including at least two positive lenses and a negative lens,
wherein a positive lens of the rear lens group is provided closest to an object side, and is made of glass,
and wherein more than half of the lenses of said front and rear lens groups are made of plastic, and satisfy the following conditional expression, $$0.7 < f_G/f < 4.0$$

where $f_G$ represents a focal length of said positive lens of the rear lens group provided closest to the object side, and f represents a focal length of the retrofocus type lens system,
wherein said front lens group comprises, from the object side, a first lens having a negative refracting power and a second lens having a positive refracting power,
wherein said rear lens group consists of, from the object side, a third lens having a positive refracting power, a fourth lens having a negative refracting power and
a fifth lens having a positive refracting power,
wherein an aperture-stop is positioned between said front lens group and said rear lens group,
wherein at least one of said first through fifth lenses has an aspheric surface, said surface having a thickness in a peripheral portion of the lens is greater than that between lens surfaces formed by a curvature in a vicinity of the optical axis, and further the following conditional expressions are satisfied, $$-5 \leq v_1 - v_2 \leq 30,$$

$$-0.020 \leq \sum_{i=3}^{5} \frac{f}{f_i v_i} \leq 0$$

where $v_1$ represents an Abbe's number of d-line of the first lens, $v_2$ represents an Abbe's number of d-line of the second lens, $f_i$ (I=3, 4, 5) represents a focal length of I-th lens, and $v_i$ (I=3, 4, 5) represents an Abbe's number of d-line of the I-th lens.

16. The retrofocus type lens system of claim 15, wherein said aspherical surface is used on said fifth lens.

17. The retrofocus type lens system of claim 15, wherein said aspherical surface is used on either said second or third lens.

18. The retrofocus type lens system of claim 15, wherein all lenses except for said third lens are made of plastic.

19. The retrofocus type lens system of claim 15 further comprising a diffraction type low-pass filter.

20. The retrofocus type lens system of claim 19 further comprising a fixed stop for cutting an off-axial light positioned either on the object side or the image side of the diffraction type low-pass filter.

21. A retrofocus type lens system comprising from an object side:
(a) a front lens group including at least one negative lens; and
(b) a rear lens group, including at least two positive lenses and a negative lens,
wherein a positive lens of the rear lens group is provided closest to an object side, and is made of glass,
and wherein more than half of the lenses of said front and rear lens groups are made of plastic, and satisfy the following conditional expression, $$0.7 < f_G/f < 4.0$$

where $f_G$ represents a focal length of said positive lens of the rear lens group provided closest to the object side, and f represents a focal length of the retrofocus type lens system,
wherein said front lens group consists of, from the object side, a biconcave lens having at least one aspherical surface,
wherein said rear lens group consists of, from the object side, a single lens having a positive refracting power and a cemented lens in which a positive lens and a negative lens are cemented together, and at least one surface of said rear lens group is aspherical, and the following conditional expressions are satisfied, $$-1.7 \leq r_a/r_b \leq 0.2$$

and $$0 \leq f_p/f_c \leq 1.1$$

where $r_a$ represents a radius of curvature on the object side of the single lens of said rear lens group, $r_b$ represents a radius of curvature on the image side of the single lens among said rear lens group, $f_p$ represents a focal length of the single lens of said rear lens group, and $f_c$ represents a focal length of the cemented lens of said rear lens group.

22. The retrofocus type lens system of claim 21 further comprising an aperture-stop provided on the object side of the cemented lens of said rear lens group.

23. The retrofocus type lens system of claim 22, wherein at least one surface adjacent to the aperture stop is aspherical, and a surface located closest to the image side of said rear lens group is aspherical.

24. The retrofocus type lens system of claim 21 further comprising a diffraction type low-pass filter.

25. The retrofocus type lens system of claim 24 further comprising a fixed stop for cutting an off-axial light positioned either on the object side or the image side of the diffraction type low-pass filter.

* * * * *